(12) United States Patent
Yao et al.

(10) Patent No.: US 9,680,594 B2
(45) Date of Patent: Jun. 13, 2017

(54) GENERATING METHOD AND DEVICE, RECEIVING METHOD AND DEVICE FOR DUAL-FREQUENCY CONSTANT ENVELOPE SIGNAL WITH FOUR SPREADING SIGNALS

(71) Applicant: Tsinghua University, Beijing (CN)

(72) Inventors: Zheng Yao, Beijing (CN); Mingquan Lu, Beijing (CN)

(73) Assignee: Tsinghua University, Beijing (CN)

( * ) Notice: Subject to any disclaimer, the term of this patent is extended or adjusted under 35 U.S.C. 154(b) by 24 days.

(21) Appl. No.: 14/443,413

(22) PCT Filed: Nov. 22, 2013

(86) PCT No.: PCT/CN2013/087732
§ 371 (c)(1),
(2) Date: May 18, 2015

(87) PCT Pub. No.: WO2014/079390
PCT Pub. Date: May 30, 2014

(65) Prior Publication Data
US 2016/0191187 A1 Jun. 30, 2016

(30) Foreign Application Priority Data
Nov. 23, 2012 (CN) .......................... 2012 1 0484613

(51) Int. Cl.
*H04W 24/00* (2009.01)
*H04W 72/04* (2009.01)
(Continued)

(52) U.S. Cl.
CPC .......... *H04J 13/0003* (2013.01); *G01S 19/02* (2013.01); *G01S 19/30* (2013.01); *G01S 19/37* (2013.01); *H04B 1/707* (2013.01); *H04J 13/18* (2013.01)

(58) Field of Classification Search
CPC ................ H04L 1/0055; H04L 27/2014; H04J 13/0003; H04J 13/18; H04W 24/00; H04W 72/04
See application file for complete search history.

(56) References Cited

U.S. PATENT DOCUMENTS

| 6,430,213 B1 | 8/2002 | Dafesh |
| 2002/0075907 A1 | 6/2002 | Cangiani |

(Continued)

FOREIGN PATENT DOCUMENTS

| CN | 102209056 | 10/2011 |
| CN | 102694569 | 9/2012 |

(Continued)

*Primary Examiner* — Andrew Lee
(74) *Attorney, Agent, or Firm* — Hamilton, DeSanctis & Cha

(57) ABSTRACT

The application relates to a generating method and device, receiving method and device for a dual-frequency constant envelope multiplexed signal with four spreading signals. According to the method, the four baseband spreading signals $s_1(t)$, $s_2(t)$, $s_3(t)$, $s_4(t)$ can be modulated to a frequency $f_1$ and a frequency $f_2$ respectively, so as to generate the constant envelope multiplexed signal on a radio carrier frequency $f_p=(f_1+f_2)/2$, where the signals $s_1(t)$ and $s_2(t)$ are modulated on the frequency $f_1$ with carrier phases orthogonal to each other, the signals $s_3(t)$ and $s_4(t)$ are modulated on the frequency $f_2$ with carrier phases orthogonal to each other, $f_1>f_2$. The method comprises: determining a power ratio allocated to the four baseband spreading signals $s_1(t)$, $s_2(t)$, $s_3(t)$, $s_4(t)$ in the constant envelope multiplexed signal; storing an additional phase lookup table, wherein the table includes additional phases of an in-phase baseband component $I(t)$ and a quadrature-phase baseband component $Q(t)$ of the constant envelope multiplexed signal; obtaining an additional phase $\theta$ of a segment of the current time by looking up the additional phase lookup table; and generating (Continued)

an in-phase baseband component I(t) and a quadrature-phase baseband component Q(t) of the constant envelope multiplexed signal, and generating the constant envelope multiplexed signal $S_{RF}(t)$ based on the obtained additional phase $\theta$.

15 Claims, 6 Drawing Sheets

(51) Int. Cl.
*H04J 13/00* (2011.01)
*G01S 19/02* (2010.01)
*H04B 1/707* (2011.01)
*G01S 19/30* (2010.01)
*G01S 19/37* (2010.01)
*H04J 13/18* (2011.01)

(56) References Cited

U.S. PATENT DOCUMENTS

| | | |
|---|---|---|
| 2002/0150068 A1 | 10/2002 | Orr |
| 2005/0100107 A1* | 5/2005 | Head ............... H04L 27/3411 375/260 |
| 2006/0038716 A1 | 2/2006 | Lestarquit |
| 2009/0109835 A1* | 4/2009 | Green ............... H04L 27/2602 370/210 |
| 2010/0202565 A1* | 8/2010 | Abbasfar ........... H04L 27/2014 375/308 |
| 2011/0051783 A1 | 3/2011 | Cahn |
| 2011/0188603 A1* | 8/2011 | Dowling ............ H04L 27/36 375/298 |
| 2011/0246638 A1* | 10/2011 | Smith ............... H04L 41/069 709/224 |
| 2012/0069936 A1* | 3/2012 | Shaver .............. H04L 1/0055 375/340 |
| 2012/0269125 A1* | 10/2012 | Porat ............... H04W 72/1231 370/328 |
| 2015/0172084 A1 | 6/2015 | Yao |
| 2015/0332324 A1* | 11/2015 | Vaysman ........... G06Q 30/0257 705/14.55 |
| 2016/0182102 A1* | 6/2016 | Wang ............... H04B 15/02 375/296 |
| 2016/0285506 A1 | 9/2016 | Yao |

FOREIGN PATENT DOCUMENTS

| | | |
|---|---|---|
| CN | 103023598 | 4/2013 |
| JP | 2007-504731 | 3/2007 |
| JP | 2011-239332 | 11/2011 |
| JP | 2015-527563 | 9/2015 |

\* cited by examiner

US 9,680,594 B2

GENERATING METHOD AND DEVICE, RECEIVING METHOD AND DEVICE FOR DUAL-FREQUENCY CONSTANT ENVELOPE SIGNAL WITH FOUR SPREADING SIGNALS

TECHNICAL FIELD

The application relates to the field of satellite navigation, and more specifically, generating method and device, receiving method and device for a dual-frequency constant envelope signal with four spreading signals.

BACKGROUND

With the development of Global Navigation Satellite System (GNSS), the requirement of navigation services is increasing. The number of signals transmitted on the same frequency band by the navigation satellite systems is growing, which aggravates the crowding of the already limited frequency band available for the satellite navigation. With growing in the number of signals broadcast in the same frequency band by a navigation system, the complexity of the satellite payload keeps increasing.

It is desired to multiplex signals on two different frequencies to certain specific requirements in the system construction and application for, e.g., the smooth transition of the adjustment in the central frequency of signal during the system update and upgrade, or transmission of multiple groups of service information with contents complimentary to each other onto two very adjacent frequencies, etc. Moreover, under the condition that the transmitting power from satellite is limited, in order to keep enough receiving power at the receiver end, it is desired that the high power transmitter on the satellite have as high power efficiency as possible. Thus, it is required that the High Power Amplifier (HPA) on the satellite keep working in the non-linear saturated region. However, when the HPA works near the saturated point, if the input signal does not have a constant envelope, the output components will be subject to such distortions as amplitude modulation, amplitude-phase conversion, and so on, which will cause the amplitude and phase distortion in the transmitting signal and seriously affect the performance of the receiving end. Therefore, it is required to ensure that the combined signal has constant envelope.

As a typical instance, AltBOC (U.S. patent application US2006/0038716A1), a constant envelope modulation technique, is applied in the signal on E5 band of European Galileo navigation system. In AltBOC, two sets of BPSK-R(10) signals respectively modulated on two separated carrier frequencies with 30.69 MHz away from each other (E5a: 1176.45 MHz, E5b: 1207.14 MHz) are combined into a constant enveloped 8PSK signal with central frequency at 1191.795 MHz. By such technique, advantageously, the number of signal transmitters carried as the payload of satellite is saved, and a wideband multiplexed signal is constructed, such that the receiver supports not only the narrowband receiving strategy by which the signal components on E5a and E5b are separately received and processed, but also the wideband receiving strategy by which the integral multiplexed signal in its full band is received for a better ranging performance. However, in AltBOC, the four signal components to be multiplexed must have equal power, which restricts the flexibility in application of the technique. As known in the GNSS, since ranging is the primary purpose of GNSS signal, it tends to allocate more power on the pilot channel than the data channel in the GNSS signal structure design, in order to promote the accuracy and robustness of pseudorange measurements and carrier phase tracking. Moreover, the adoption of different spreading code chip waveforms by signal components (such as BPSK-R, sine-phased BOC, cosine-phased BOC, TMBOC, QMBOC, etc.) results in the different performance in acquisition, tracking and data demodulation at the receiver end. Therefore, it is required to provide a dual-frequency constant envelope multiplex technique for GNSS signals which is more flexible than AltBOC, in particular, such that the four components can be different in power allocation and the spreading code chip waveform of different signal components can be flexibly selected.

PCT international patent application no. PCT/CN2013/000675, with the title of "Satellite Navigation Signal and Generation Method, Generation Device, Receiving Method and Receiving Device Therefor", discloses a method for generating a multiplexed signal with constant envelope based on the values and power ratio of four signal components to be multiplexed. According to this method, the in-phase baseband component and quadrature-phase baseband component of the multiplexed signal satisfying the requirement for constant envelope can be calculated. However, the calculation of the in-phase baseband component and quadrature-phase baseband component of the multiplexed signal in a satellite navigation signal generating device will result in the increase of the complexity in implementing the device.

SUMMARY

The purpose of the present application is to provide a generating method and device, receiving method and device for a dual-frequency constant envelope signal with four spreading signals, which can at least partially address the issues in the prior art.

According to an aspect of the present application, a method for generating a dual-frequency constant envelope multiplexed signal with four spreading signals is disclosed, in which the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $f_p=(f_1+f_2)/2$, where the signals $s_1(t)$ and $s_2(t)$ are modulated on the frequency $f_1$ with carrier phases orthogonal to each other, and the signals $s_3(t)$ and $s_4(t)$ are modulated on the frequency $f_2$ with carrier phases orthogonal to each other, $f_1>f_2$, wherein the method further comprises:

determining a power ratio allocated to the four baseband spreading signals $s_1(t)$, $s_2(t)$, $s_3(t)$, $s_4(t)$ in the constant envelope multiplexed signal;

storing an additional phase lookup table, wherein the table includes additional phases of an in-phase baseband component I(t) and a quadrature-phase baseband component Q(t) of the constant envelope multiplexed signal, and the table is configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$;

obtaining, according to a segment of the subcarrier period of the baseband spreading signal and to a state of the value combination of the four baseband spreading signals $s_1(t)$, $s_2(t)$, $s_3(t)$ and $s_4(t)$ corresponding to the current time, an additional phase θ of a segment of the current time by looking up the additional phase lookup table;

generating an in-phase baseband component I(t) and a quadrature-phase baseband component Q(t) of the constant envelope multiplexed signal, and generating the constant envelope multiplexed signal $S_{RF}(t)$ based on the obtained additional phase θ, where $S_{RF}(t)=I(t)\cos(2\pi f_p t)-Q(t)\sin(2\pi f_p t)$, $I(t)=A\cos(\theta)$, $Q(t)=A\sin(\theta)$, $f_p=(f_1+f_2)/2$, $T_s=1/f_s$, $f_s=(f_1-f_2)/2$, where A is the amplitude of the constant envelope multiplexed signal $S_{RF}(t)$.

According to a further aspect of the present application, a device for generating a dual-frequency constant envelope multiplexed signal with four spreading signals is disclosed, in which the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $f_p=(f_1+f_2)/2$, where the signals $s_1(t)$ and $s_2(t)$ are modulated on the frequency $f_1$ with carrier phases orthogonal to each other, the signals $s_3(t)$ and $s_4(t)$ are modulated on the frequency $f_2$ with carrier phases orthogonal to each other, $f_1>f_2$, wherein the device further comprises:

an additional phase lookup table storing unit for storing the additional phase lookup table, wherein the table includes additional phases of an in-phase baseband component I(t) and a quadrature-phase baseband component Q(t) of the constant envelope multiplexed signal, and the table is configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$;

an lookup unit for obtaining, by looking up the additional phase lookup table according to a segment of the subcarrier period of the baseband spreading signal and to a state of the value combination of the four baseband spreading signals $s_1(t)$, $s_2(t)$, $s_3(t)$ and $s_4(t)$ corresponding to the current time, an additional phase θ of a segment of the current time;

a generating unit for generating an in-phase baseband component I(t) and a quadrature-phase baseband component Q(t) of the constant envelope multiplexed signal, and generating the constant envelope multiplexed signal $S_{RF}(t)$ based on the obtained additional phase θ, where $S_{RF}(t)=I(t)\cos(2\pi f_p t)-Q(t)\sin(2\pi f_p t)$, $I(t)=A\cos(\theta)$, $Q(t)=A\sin(\theta)$, $f_p=(f_1+f_2)/2$, $T_s=1/f_s$, $f_s=(f_1-f_2)/2$, where A is the amplitude of the constant envelope multiplexed signal $S_{RF}(t)$.

According to a further aspect of the present application, a constant envelope multiplexed signal is disclosed, which is generated by the aforementioned method or device for generating the dual-frequency constant envelope multiplexed signal with four spreading signals.

According to a further aspect of the present application, an apparatus is disclosed, which comprises means adapted to process a constant envelope multiplexed signal generated by the aforementioned method or device for generating the dual-frequency constant envelope multiplexed signal with four spreading signals.

According to a further aspect of the present application, a constant envelope multiplexed signal receiving device is disclosed, which receives the constant envelope multiplexed signal generated by the aforementioned method or device for generating the dual-frequency constant envelope multiplexed signal with four spreading signals.

According to a further aspect of the present application, a signal receiving device is disclosed, which receives the aforementioned constant envelope multiplexed signal, or the constant envelope multiplexed signal generated by the aforementioned method or device for generating the dual-frequency constant envelope multiplexed signal with four spreading signals, which comprises:

a receiving unit for receiving the constant envelope multiplexed signal;

a demodulation unit for demodulating a signal component modulated on the frequency $f_1$ of the received constant envelope multiplexed signal, and for demodulating a signal component modulated on the frequency $f_2$ of the received constant envelope multiplexed signal; and a processing unit for obtaining baseband spreading signals $s_1(t)$ and $s_2(t)$ based on the demodulated signal component which is modulated on the frequency $f_1$, and for obtaining baseband spreading signals $s_3(t)$ and $s_4(t)$ based on the demodulated signal component which is modulated on the frequency $f_2$.

According to a further aspect of the present application, a signal receiving device is disclosed, which receives the aforementioned constant envelope multiplexed signal, or the constant envelope multiplexed signal generated by the aforementioned method or device for generating the dual-frequency constant envelope multiplexed signal with four spreading signals, wherein the additional phase lookup table is stored in the signal receiving device and the signal receiving device comprises:

a receiving unit for receiving the constant envelope multiplexed signal;

a demodulation unit for demodulating the received constant envelope multiplexed signal with a central frequency of $f_p=(f_1+f_2)/2$ so as to obtain the demodulated baseband signal;

an additional phase looking up unit for obtaining, based on the additional phase lookup table, an additional phase θ corresponding to each state among states of value combination of the four baseband spreading signals $s_1(t)$, $s_2(t)$, $s_3(t)$, $s_4(t)$;

a local replica generating unit for generating, based on the obtained additional phase θ, a local replica $\tilde{I}_i(t)$ of an in-phase baseband signal and a local replica $\tilde{Q}_i(t)$ of a quadrature-phase baseband signal corresponding to each state; and a calculating unit for calculating a correlation between the generated $\tilde{I}_i(t)$ and $\tilde{Q}_i(t)$ corresponding to each state with the demodulated baseband signal, to determine the baseband spreading signals $s_1(t)$, $s_2(t)$, $s_3(t)$, $s_4(t)$ of the demodulated baseband signal, so as to achieve the acquisition and tracking of the constant envelope multiplexed signal.

According to a further aspect of the present application, a signal receiving device is disclosed, which receives the aforementioned constant envelope multiplexed signal, or the constant envelope multiplexed signal generated by the aforementioned method or device for generating the dual-frequency constant envelope multiplexed signal with four spreading signals, wherein the additional phase lookup table is stored in the signal receiving device and the signal receiving device comprises:

a receiving unit for receiving, filtering and amplifying the constant envelope multiplexed signal, wherein a central frequency of the filtering and amplifying is set at $(f_1+f_2)/2$;

a demodulation unit for converting a carrier frequency of the signal component to be processed to a corresponding intermediate frequency, converting the signal component from analog to digital by sampling and quantizing the signal, and obtaining a receiver in-phase baseband signal SI(t) and a receiver quadrature-phase baseband signal SQ(t) by multiplying the converted digital intermediate frequency signal by an in-phase carrier and a quadrature-phase carrier respectively;

an additional phase looking up unit for generating a spreading sequence of four baseband spreading signals with spreading chip waveform assignment, and generating, based on all the possible value combinations of the binary baseband local signal replica of the four baseband spreading signals, an in-phase baseband signal local replica $\tilde{I}_i(t)$ and a quadrature-phase baseband signal local replica $\tilde{Q}_i(t)$ corresponding to each combination in the additional phase looking up unit, at each epoch, wherein the number of value combinations is denoted as g, $g=2^N$, where there are N data channels, and for a special case $S_i=\{\tilde{s}_1, \tilde{s}_2, \tilde{s}_3, \tilde{s}_4\}$ among the g value combinations, the generating rule of $\tilde{I}_i(t)$ and $\tilde{Q}_i(t)$ is same as the transmitting device, and for obtaining the additional phase $\theta_i$ of the current time by looking up the additional phase lookup table;

a local replica generating unit for generating the in-phase baseband signal local replica $\tilde{I}_i(t)$ and the quadrature-phase baseband signal local replica $\tilde{Q}_i(t)$, where $\tilde{I}_i(t)=\cos(\theta_i)$ $\tilde{Q}_i(t)=\sin(\theta_i)$; and a calculating unit for obtaining the i-th (i=1, 2, . . . , g) group of a first in-phase correlation value corr1$I_i$ and a first quadrature-phase correlation value corr1$Q_i$ by multiplying the i-th (i=1, 2, . . . , g) group of the in-phase baseband signal local replica $\tilde{I}_i(t)$ with the in-phase baseband signal SI(t) and the quadrature-phase baseband signal SQ(t) and sending the multiplying results into an integration and dumping filter for coherent integration with duration of TI, and for obtaining the i-th (i=1, 2, . . . , g) group of the second in-phase correlation value corr2$I_i$ and the quadrature-phase correlation value corr2$Q_i$ by multiplying each group of the quadrature-phase baseband signal local replica $\tilde{Q}_i(t)$ with the in-phase baseband signal SI(t) and the quadrature-phase baseband signal SQ(t) and sending the multiplying results into the integration and dumping filter for the coherent integration with duration of TI;

for obtaining the i-th (i=1, 2, . . . , g) group of in-phase combination correlation value $I'_i$ and the quadrature-phase combination correlation value $Q'_i$ by combining the first in-phase correlation value corr1$I_i$ and the first quadrature-phase correlation value corr1$Q_i$ of the i-th group with the second in-phase correlation value corr2$I_i$ and the second quadrature-phase correlation value corr2$Q_i$ of the i-th group as:

$$\begin{cases} I'_i = \text{corr2}I_i + \text{corr1}Q_i \\ Q'_i = \text{corr1}I_i - \text{corr2}Q_i \end{cases};$$

and for selecting an optimal in-phase combination correlation value I' and an optimal quadrature-phase combination correlation value Q' to be a group of in-phase combination correlation value $I'_i$ and quadrature-phase combination correlation value $Q'_i$, the value $\sqrt{{I'_i}^2+{Q'_i}^2}$ of which is the maximum among all the groups, so as to determine the baseband spreading signal $s_1(t)$, $s_2(t)$, $s_3(t)$, $s_4(t)$, and to process I' and Q' through traditional acquisition method and tracking loop.

DETAILED DESCRIPTION

Figure 1:
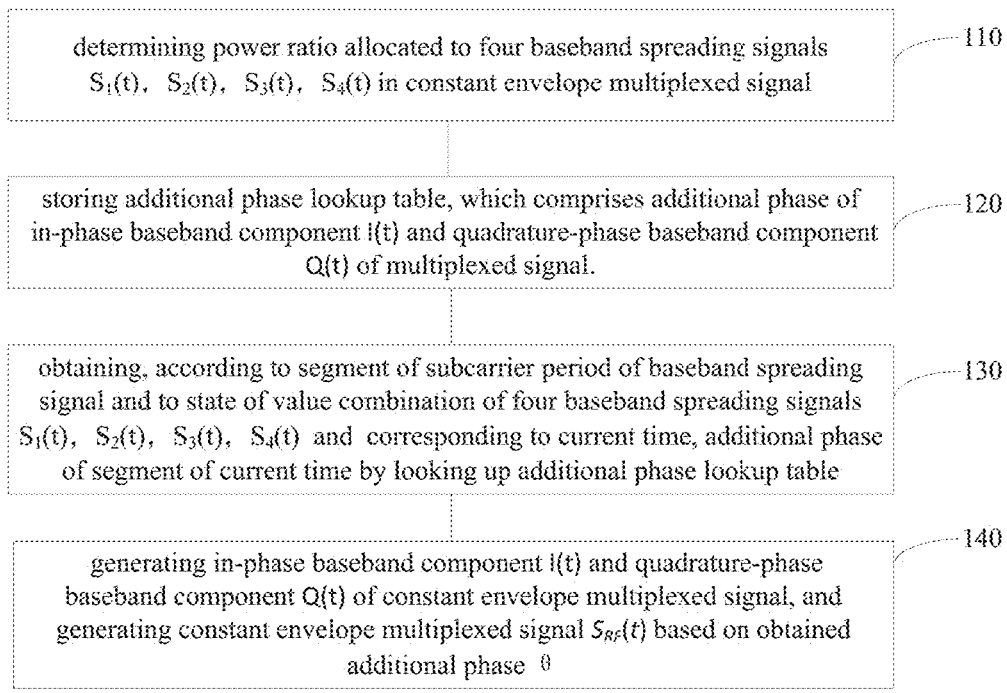
FIG. 1 illustrates a flowchart of a method for generating a dual-frequency constant envelope multiplexed signal with four spreading signals according to an embodiment of the application.

Hereinafter, with reference to the appended drawings, a detailed description of the generating method, generating device, receiving method and receiving device of the dual-frequency constant envelope multiplexed signal with four spreading signals will be provided. For simplicity, in the description of the embodiments of the present application, the same or similar reference numeral is used for the same or similar device.

FIG. 1 illustrates a method for generating a dual-frequency constant envelope multiplexed signal with four spreading signals according to an embodiment of the present application. According to this method, the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $f_p=(f_1+f_2)/2$, where the signals $s_1(t)$ and $s_2(t)$ are modulated on the frequency $f_1$ with carrier phases orthogonal to each other, the signals $s_3(t)$ and $s_4(t)$ are modulated on the frequency $f_2$ with carrier phases orthogonal to each other, $f_1>f_2$, and the generated dual-frequency signal with four spreading signals is a constant envelope multiplexed signal.

Particularly, as shown in FIG. 1, in Step 110, the power ratio allocated to the four baseband spreading signals $s_1(t)$, $s_2(t)$, $s_3(t)$, $s_4(t)$ in the constant envelope multiplexed signal is determined. The power ratio allocated to the four baseband spreading signals $s_1(t)$, $s_2(t)$, $s_3(t)$, $s_4(t)$ is denoted as $c_1:c_2:c_3:c_4$ which can be set as any ratio depending on the applicational requirement. For example, the power ratio can be, but is not limited to, set as 1:2:1:2, 1:3:1:3 or 1:5:1:5, etc.

In Step 120, an additional phase lookup table is stored. The table includes an additional phase of an in-phase baseband component I(t) and a quadrature-phase baseband component Q(t) of the constant envelope multiplexed signal.

In an embodiment of the present application, the additional phase lookup table may be configured as follows.

The table may be configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $S_3(t)$, $s_4(t)$ in the constant envelope multiplexed signal, based on the determined power ratio $c_1:c_2:c_3:c_4$ of the four baseband spreading signals $s_1(t)$, $s_2(t)$, $s_3(t)$, $s_4(t)$. According to an embodiment of the present application, the additional phase lookup table may be preset and stored in a navigation signal transmitter or a signal generating device. Therefore, when an additional phase is to be determined, it is only needed to look up the additional phase look-up table, which reduces the calculating complexity of the navigation signal transmitter or the signal generating device.

In Step 130, by searching the additional phase lookup table according to a segment of the subcarrier period of the baseband spreading signal and to a state of the value combination of the four baseband spreading signals $s_1(t)$, $s_2(t)$, $s_3(t)$ and $s_4(t)$ corresponding to the current time, an additional phase θ of a segment of the current time may be obtained. As can be understood, the current time belongs to a certain subcarrier period of the baseband spreading signal, which is $t \in [nT_s, (n+1)T_s)$. Since the subcarrier period $T_s$ is divided into multiple segments, the current time t corresponds to a certain segment among those segments. Moreover, for a current time, the values of the four baseband spreading signal $s_1(t)$, $s_2(t)$, $s_3(t)$, $s_4(t)$ correspond to one of the 16 value combinations. Therefore, it is possible to look up the stored additional phase lookup table so as to obtain the additional phase of the current segment, based on a certain segment of the subcarrier period of the baseband spreading signal to which the current time corresponds, and a certain one of the 16 value combinations to which the current value of the four baseband spreading signals $s_1(t)$, $s_2(t)$, $s_3(t)$, $s_4(t)$ corresponds.

In Step 140, based on the obtained additional phase θ, an in-phase baseband component I(t) and a quadrature-phase baseband component Q(t) of the constant envelope multiplexed signal are generated, and the multiplexed signal $S_{RF}(t)$ with constant envelope is generated, where $$S_{RF}(t)=I(t)\cos(2\pi f_p t)-Q(t)\sin(2\pi f_p t),$$

$$I(t)=A\cos(\theta),$$

$$Q(t)=A\sin(\theta),$$

$$f_p=(f_1+f_2)/2,$$

$$T_s=1/f_s,$$

$$f_s=(f_1-f_2)/2,$$

where A is the amplitude of the constant envelope multiplexed signal $S_{RF}(t)$. As can be seen, for every current time, or every segment to which the current time corresponds, it is possible to look up the additional phase θ so as to generate the constant envelope multiplexed signal $S_{RF}(t)$, where the amplitude of the multiplexed signal $S_{RF}(t)$ is a constant A.

Through the method of the present application, the four baseband spreading signal $s_1(t)$, $s_2(t)$, $s_3(t)$, $s_4(t)$ may be modulated on the frequency $f_p$, where the $s_1(t)$ and $s_2(t)$ are modulated on the frequency $f_1$ with carrier phases orthogonal to each other, and $s_3(t)$ and $s_4(t)$ are modulated on the frequency $f_2$ with carrier phases orthogonal to each other. The multiplexed signal modulated on the radio carrier frequency $f_p$, is a constant envelope multiplexed signal.

According to an embodiment of the present application, the additional phase lookup table may be configured as follows.

As mentioned, according to the method of the present application, four baseband spreading signals $s_1(t)$, $s_2(t)$, $s_3(t)$, $s_4(t)$ are modulated on the frequency $f_1$ and $f_2$ respectively, so as to generate a constant envelope multiplexed signal $S_{RF}(t)$ on a radio carrier frequency $f_p=(f_1+f_2)/2$. For a signal on a carrier frequency $f_p$, it is possible to express the signal through two orthogonal components modulated to the frequency $f_p$, which is $$S_{RF}(t)=I(t)\cos(2\pi f_p t)-Q(t)\sin(2\pi f_p t),$$

where I(t) is an in-phase baseband component of the constant envelope multiplexed signal, and Q(t) is a quadrature-phase baseband component of the constant envelope multiplexed signal.

According to the present application, in the additional phase lookup table, the additional phase θ of the in-phase baseband component I(t) and quadrature-phase baseband component Q(t) of the constant envelope multiplexed signal is stored. The additional phase refers to the phase θ that is used to deform the multiplexed signal $S_{RF}(t)$ in the following expression:

$$S_{RF}(t)=I(t)+jQ(t)=A\exp(j\theta)$$

where $A=\sqrt{I^2+Q^2}$ expresses the amplitude of $S_{RF}(t)$, and the phase θ expresses the additional phase of the in-phase baseband component I(t) and quadrature-phase baseband component Q(t) of the multiplexed signal $S_{RF}(t)$.

According to an embodiment of the present application, a preset in-phase baseband component Î(t) and a preset quadrature-phase baseband component $\hat{Q}(t)$ can be obtained by the following expressions:

$$\hat{I}(t)=Z(t)\times sgn[\sin(2\pi f_s t+\phi(t))],$$

$$\hat{Q}(t)=Z'(t)\times sgn[\sin(2\pi f_s t+\phi'(t))],$$

wherein sgn stands for the sign function $$sgn(x) = \begin{cases} +1, & x \geq 0 \\ -1, & x < 0 \end{cases}$$

$$Z(t) = \sqrt{\left(\sqrt{c_1}\,s_1(t)+\sqrt{c_3}\,s_3(t)\right)^2 + \left(\sqrt{c_2}\,s_2(t)-\sqrt{c_4}\,s_4(t)\right)^2}$$

$$\varphi(t) = -a\tan 2\left(\sqrt{c_1}\,s_1(t)+\sqrt{c_3}\,s_3(t),\ \sqrt{c_2}\,s_2(t)-\sqrt{c_4}\,s_4(t)\right)$$

$$Z'(t) = \sqrt{\left(\sqrt{c_1}\,s_1(t)-\sqrt{c_3}\,s_3(t)\right)^2 + \left(\sqrt{c_2}\,s_2(t)+\sqrt{c_4}\,s_4(t)\right)^2}$$

$$\varphi'(t) = a\tan 2\left(\sqrt{c_2}\,s_2(t)+\sqrt{c_4}\,s_4(t),\ \sqrt{c_1}\,s_1(t)-\sqrt{c_3}\,s_3(t)\right)$$

wherein $c_1$, $c_2$, $c_3$, $c_4$ are relative powers of the four baseband spreading signals $s_1(t)$, $s_2(t)$, $s_3(t)$, $s_4(t)$, that is, the power ratio allocated to the four baseband spreading signals $s_1(t)$, $s_2(t)$, $s_3(t)$, $s_4(t)$ is $c_1:c_2:c_3:c_4$, atan 2 is the four-quadrant arctangent function, $$a\tan 2(y,x) = \begin{cases} \arccos\left(\dfrac{y}{\sqrt{x^2+y^2}}\right), & x \geq 0,\ \sqrt{x^2+y^2} > 0 \\ -\arccos\left(\dfrac{y}{\sqrt{x^2+y^2}}\right), & x < 0 \\ 0, & \sqrt{x^2+y^2} = 0 \end{cases}$$

While the preset in-phase baseband component $\hat{I}(t)$ and the preset quadrature-phase baseband component $\hat{Q}(t)$ are obtained, the multiplexed signal $S_{RF}(t)$ can be expressed as $$S_{RF}(t)=\hat{I}(t)+j\hat{Q}(t)=A\exp(j\theta).$$

Therefore, the value of the additional phase $\theta$ can be obtained by $$\theta=a\tan 2(\hat{Q}(t),\hat{I}(t))$$

where atan 2 is the four-quadrant arctangent function.

In addition, it can be seen that $A=\sqrt{I^2+Q^2}=\sqrt{c_1+c_2+c_3+c_4}$ is a constant value without changing over time. Therefore, the dual-frequency constant envelope multiplexed signal with four spreading signals $S_{RF}(t)$ in the present application is a constant envelope multiplexed signal. The envelope of the multiplexed signal can be determined by the relative power, or the power ratio of the four baseband spreading signals $s_1(t)$, $s_2(t)$, $s_3(t)$, $s_4(t)$.

It is appreciated that the method of calculating the additional phase is descriptive but not limited. Any method for calculating the additional phase will be included in the present application as long as the additional phase $\theta$ obtained through the method is such that the multiplexed signal $S_{RF}(t)$ is of the constant envelop.

According to an embodiment of the present application, the additional phase $\theta=a\tan 2(\hat{Q}(t), \hat{I}(t))$ and, as mentioned, atan 2 is the four-quadrant arctangent function, and thereby the additional phase $\theta$ is determined by values of $\hat{I}(t)$ and $\hat{Q}(t)$.

Figure 2:
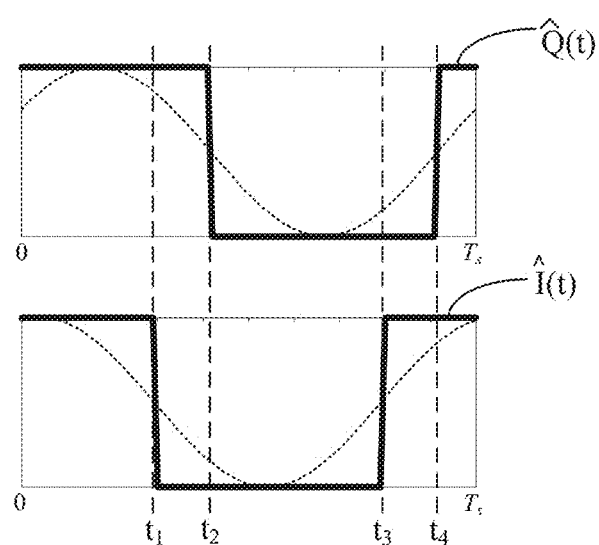
FIG. 2 illustrates a schematic diagram of values of $\hat{I}(t)$ and $\hat{Q}(t)$ in a subcarrier period of a baseband spreading signal according to an embodiment of the application.

FIG. 2 illustrates a schematic diagram of values of $\hat{I}(t)$ and $\hat{Q}(t)$ in a subcarrier period of a baseband spreading signal according to an embodiment of the present application. As shown, any of a preset in-phase baseband component $\hat{I}(t)$ and a preset quadrature-phase baseband component $\hat{Q}(t)$ of the multiplexed signal $S_{RF}(t)$ is of a square waveform, whose starting points are determined by $\phi(t)$ and $\phi'(t)$. Since the additional phase $\theta=a\tan 2(\hat{Q}(t), \hat{I}(t))$ and any of the $\hat{I}(t)$ and $\hat{Q}(t)$ is of a square waveform, the value of the additional phase $\theta$ may shift at moments when the value of $\hat{I}(t)$ or $\hat{Q}(t)$ flips, for example, at $t_1$, $t_2$, $t_3$ and $t_4$ as shown in FIG. 2. Since each of the baseband spreading signals $s_1(t)$, $s_2(t)$, $s_3(t)$, $s_4(t)$ is a baseband signal with the value of $+/-1$, there is a total of 16 states of different value combinations for the four baseband spreading signals, such as $(1,1,1,1)$ or $(1,-1,-1,1)$, etc. $\hat{I}(t)$ and $\hat{Q}(t)$ can be calculated corresponding to each state among the total 16 states, and thus phase-shifting points of the additional phase $\theta$ can be calculated. All the phase-shifting points of the additional phase $\theta$ constitute a set of the starting points and ending points of segments in a subcarrier period of the baseband spreading signal. That is, the additional phase $\theta$ keeps unchanged during a segment of the subcarrier period, and will change in the next segment. Considering that the phase-shifting points of the additional phase $\theta$ determined by the 16 value combinations of $\hat{I}(t)$ and $\hat{Q}(t)$ may be overlapped, it can be seen, through calculation, that a subcarrier period of the baseband spreading signal can be divided into at most 16 segments for various power ratios of the four baseband spreading signals.

Hereinafter, a power ratio of the four baseband spreading signals $s_1(t)$, $s_2(t)$, $s_3(t)$, $s_4(t)$ as 1:3:1:3 is given as an exemplary description.

According to the above mentioned method, when the power ratio is 1:3:1:3, a subcarrier period of the baseband spreading signal needs to be divided into 12 segments with equal length. That is, for any current time $t\in[nT_s, (n+1)T_s)$, the subcarrier period $[nT_s, (n+1)T_s)$ is further divided into 12 segments with equal length of $T_s/12$. According to a certain segment of the subcarrier period of the baseband spreading signal $[nT_s, (n+1)T_s)$ to which the current time t belongs, and a certain one of the 16 states to which the current value combination of the four baseband spreading signals $s_1(t)$, $s_2(t)$, $s_3(t)$, $s_4(t)$ corresponds, an additional phase $\theta$ corresponding to the current time can be looked up in the additional phase lookup table, such as in the Table 1 or Table 2. In the additional phase lookup table, P1, P2, P3, P4, P5, P6, P7, P8, P9, P10, P11, P12 are 12 different phase values, satisfying $$P_K = P_1 + \frac{k\pi}{6},$$

corresponding to 12 phase points in a 12-PSK constellation.

Figure 3:
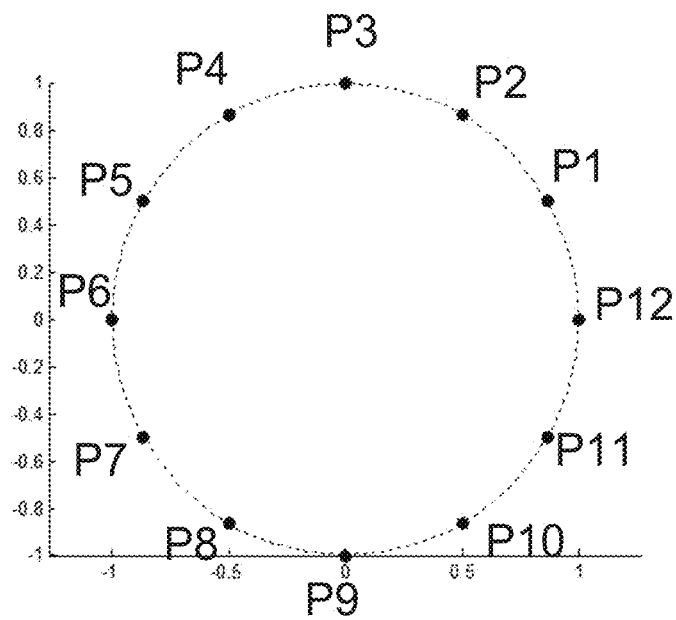
FIG. 3 illustrates a constellation of multiplexed signal $S_{RF}(t)$ when the power ratio of the four baseband spreading signals $s_1(t)$, $s_2(t)$, $s_3(t)$, $s_4(t)$ is 1:3:1:3 according to an embodiment of the application.

FIG. 3 illustrates a Fresnel constellation of multiplexed signal $S_{RF}(t)$ when the power ratio of the four baseband spreading signals $s_1(t)$, $s_2(t)$, $s_3(t)$, $s_4(t)$ is 1:3:1:3, according to an embodiment of the present application. According to the embodiment as shown in the FIG. 3, $$P_1 = \frac{\pi}{6},$$

and, as can be seen, the multiplexed signal is a 12-PSK signal, where the constellation points are evenly distributed. When another value is selected for $P_1$, the constellation may be obtained by rotating the FIG. 3 by a certain phase, while the relationship among different phases keeps unchanged.

That is, since the rotation of the 12-PSK constellation as a whole will not influence the receiving side, $P_1$ can be set as any phase in $[0,2\pi]$. It is easy to understand that, values of the additional phases in the Table.1 and Table.2 change when different values are set for $P_1$, while the relationship among different phases keeps satisfying $$P_K = P_1 + \frac{k\pi}{6},$$

and the signal generating rule with respect to the time and signal value combination also satisfies the Table 1 or Table 2.

$$P_K = P_1 + \frac{k\pi}{6},$$

$P_1$ can be arbitrary phase belonging to $[0,2\pi]$; $t'=t \bmod T_s$ shows that the additional phase $\theta$ is obtained with the modulo of the current time t and the subcarrier period $T_s$.

In this way, based on the additional phase $\theta$ obtained, the in-phase baseband component I(t) and quadrature-phase baseband component Q(t) of the constant envelope multiplexed signal are generated, and the multiplexed signal with constant envelope $S_{RF}(t)$ is generated, where $$S_{RF}(t)=I(t)\cos(2\pi f_p t)-Q(t)\sin(2\pi f_p t),$$

$$I(t)=A\cos(\theta),$$

TABLE 1

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | −1 | −1 | −1 | −1 | −1 | −1 | −1 | −1 |
| $s_2(t)$ | 1 | 1 | −1 | −1 | 1 | 1 | −1 | −1 | 1 | 1 | −1 | −1 | 1 | 1 | −1 | −1 |
| $s_3(t)$ | 1 | 1 | 1 | 1 | −1 | −1 | −1 | −1 | 1 | 1 | 1 | 1 | −1 | −1 | −1 | −1 |
| $s_4(t)$ | 1 | −1 | 1 | −1 | 1 | −1 | 1 | −1 | 1 | −1 | 1 | −1 | 1 | −1 | 1 | −1 |

| $t' = t \bmod T_s$ $t' \in$ | | | | | | | | | $\theta$ | | | | | | | |
|---|---|---|---|---|---|---|---|---|---|---|---|---|---|---|---|---|
| $[0, T_s/12)$ | P2 | P12 | P12 | P10 | P3 | P5 | P1 | P9 | P3 | P7 | P11 | P9 | P4 | P6 | P6 | P8 |
| $[T_s/12, 2T_s/12)$ | P2 | P6 | P12 | P10 | P3 | P5 | P1 | P9 | P3 | P7 | P11 | P9 | P4 | P6 | P12 | P8 |
| $[2T_s/12, 3T_s/12)$ | P2 | P6 | P12 | P10 | P3 | P5 | P1 | P3 | P9 | P7 | P11 | P9 | P4 | P6 | P12 | P8 |
| $[3T_s/12, 4T_s/12)$ | P8 | P6 | P12 | P4 | P3 | P5 | P1 | P3 | P9 | P7 | P11 | P9 | P10 | P6 | P12 | P2 |
| $[4T_s/12, 5T_s/12)$ | P8 | P6 | P12 | P4 | P9 | P5 | P1 | P3 | P9 | P7 | P11 | P3 | P10 | P6 | P12 | P2 |
| $[5T_s/12, 6T_s/12)$ | P8 | P6 | P6 | P4 | P9 | P5 | P1 | P3 | P9 | P7 | P11 | P3 | P10 | P12 | P12 | P2 |
| $[6T_s/12, 7T_s/12)$ | P8 | P6 | P6 | P4 | P9 | P11 | P7 | P3 | P9 | P1 | P5 | P3 | P10 | P12 | P12 | P2 |
| $[7T_s/12, 8T_s/12)$ | P8 | P12 | P6 | P4 | P9 | P11 | P7 | P3 | P9 | P1 | P5 | P3 | P10 | P12 | P6 | P2 |
| $[8T_s/12, 9T_s/12)$ | P8 | P12 | P6 | P4 | P9 | P11 | P7 | P9 | P3 | P1 | P5 | P3 | P10 | P12 | P6 | P2 |
| $[9T_s/12, 10T_s/12)$ | P2 | P12 | P6 | P10 | P9 | P11 | P7 | P9 | P3 | P1 | P5 | P3 | P4 | P12 | P6 | P8 |
| $[10T_s/12, 11T_s/12)$ | P2 | P12 | P6 | P10 | P3 | P11 | P7 | P9 | P3 | P1 | P5 | P9 | P4 | P12 | P6 | P8 |
| $[11T_s/12, T_s)$ | P2 | P12 | P12 | P10 | P3 | P11 | P7 | P9 | P3 | P1 | P5 | P9 | P4 | P6 | P6 | P8 |

$$Q(t)=A\sin(\theta),$$

TABLE 2

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | −1 | −1 | −1 | −1 | −1 | −1 | −1 | −1 |
| $s_2(t)$ | 1 | 1 | −1 | −1 | 1 | 1 | −1 | −1 | 1 | 1 | −1 | −1 | 1 | 1 | −1 | −1 |
| $s_3(t)$ | 1 | 1 | 1 | 1 | −1 | −1 | −1 | −1 | 1 | 1 | 1 | 1 | −1 | −1 | −1 | −1 |
| $s_4(t)$ | 1 | −1 | 1 | −1 | 1 | −1 | 1 | −1 | 1 | −1 | 1 | −1 | 1 | −1 | 1 | −1 |

| $t' = t \bmod T_s$ $t'$ | | | | | | | | | $\theta$ | | | | | | | |
|---|---|---|---|---|---|---|---|---|---|---|---|---|---|---|---|---|
| $[0, T_s/12)$ | P1 | P12 | P12 | P11 | P3 | P4 | P2 | P9 | P3 | P8 | P10 | P9 | P5 | P6 | P6 | P7 |
| $[T_s/12, 2T_s/12)$ | P1 | P12 | P12 | P11 | P3 | P4 | P2 | P3 | P9 | P8 | P10 | P9 | P5 | P6 | P6 | P7 |
| $[2T_s/12, 3T_s/12)$ | P1 | P6 | P12 | P11 | P3 | P4 | P2 | P3 | P9 | P8 | P10 | P9 | P5 | P6 | P12 | P7 |
| $[3T_s/12, 4T_s/12)$ | P7 | P6 | P12 | P5 | P3 | P4 | P2 | P3 | P9 | P8 | P10 | P9 | P11 | P6 | P12 | P1 |
| $[4T_s/12, 5T_s/12)$ | P7 | P6 | P6 | P5 | P3 | P4 | P2 | P3 | P9 | P8 | P10 | P9 | P11 | P12 | P12 | P1 |
| $[5T_s/12, 6T_s/12)$ | P7 | P6 | P6 | P5 | P9 | P4 | P2 | P3 | P9 | P8 | P10 | P3 | P11 | P12 | P12 | P1 |
| $[6T_s/12, 7T_s/12)$ | P7 | P6 | P6 | P5 | P9 | P10 | P8 | P3 | P9 | P2 | P4 | P3 | P11 | P12 | P12 | P1 |
| $[7T_s/12, 8T_s/12)$ | P7 | P6 | P6 | P5 | P9 | P10 | P8 | P9 | P3 | P2 | P4 | P3 | P11 | P12 | P12 | P1 |
| $[8T_s/12, 9T_s/12)$ | P7 | P12 | P6 | P5 | P9 | P10 | P8 | P9 | P3 | P2 | P4 | P3 | P11 | P12 | P6 | P1 |
| $[9T_s/12, 10T_s/12)$ | P1 | P12 | P6 | P11 | P9 | P10 | P8 | P9 | P3 | P2 | P4 | P3 | P5 | P12 | P6 | P7 |
| $[10T_s/12, 11T_s/12)$ | P1 | P12 | P12 | P11 | P9 | P10 | P8 | P9 | P3 | P2 | P4 | P3 | P5 | P6 | P6 | P7 |
| $[11T_s/12, T_s)$ | P1 | P12 | P12 | P11 | P3 | P10 | P8 | P9 | P3 | P2 | P4 | P9 | P5 | P6 | P6 | P7 | wherein $VS_i$, i=1, 2, 3 . . . , 16 stands for the 16 states of the value combination of the four baseband spreading signals $s_1(t)$, $s_2(t)$, $s_3(t)$, $s_4(t)$; $P_K$, K=1, 2, 3 . . . , 12 stands for the value of the additional phase $\theta$, with $$f_p=(f_1+f_2)/2,$$

$$T_s=1/f_s,$$

$$f_s=(f_1-f_2)/2,$$

wherein A is the amplitude of the constant envelope multiplexed signal $S_{RF}(t)$.

Figure 4:
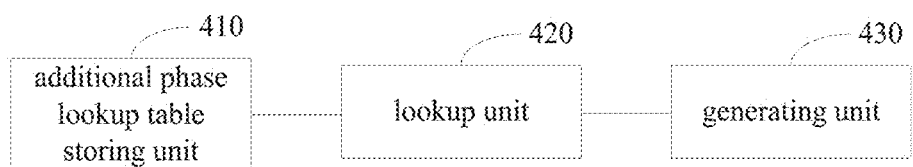
FIG. 4 illustrates a block diagram of the generating device of the dual-frequency constant envelope multiplexed signal with four spreading signals according to an embodiment of the application.

FIG. 4 illustrates a block diagram of the generating device of the dual-frequency constant envelope multiplexed signal with four spreading signals, according to an embodiment of the present application. As shown in FIG. 4, the generating device for the dual-frequency constant envelope multiplexed signal with four spreading signals comprises an additional phase lookup table storing unit 410, a lookup unit 420, and a generating unit 430.

The additional phase lookup table storing unit 410 is configured to store the mentioned additional phase lookup table, which includes additional phases of the in-phase baseband component I(t) and quadrature-phase baseband component Q(t) of the multiplexed signal. The additional phase lookup table may be preset as follows and stored in the additional phase lookup table storing unit 410. The additional phase lookup table may be configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$.

The lookup unit 420 is configured to obtain, according to a segment of the subcarrier period of the baseband spreading signal and a state of the value combination of the four baseband spreading signals $s_1(t)$, $s_2(t)$, $s_3(t)$ and $s_4(t)$ corresponding to the current time, an additional phase θ of a segment of the current time by looking up the additional phase lookup table.

The generating unit 430 is configured to generate an in-phase baseband component I(t) and a quadrature-phase baseband component Q(t) of the constant envelope multiplexed signal, and then generate the constant envelope multiplexed signal $S_{RF}(t)$ based on the obtained additional phase θ, where $S_{RF}(t)=I(t)\cos(2\pi f_P t)-Q(t)\sin(2\pi f_P t), I(t)=A\cos(\theta)$, $Q(t)=A\sin(\theta)$, $f_P=(f_1+f_2)/2$, $T_s=1/f_s$, $f_s=(f_1-f_2)/2$, wherein A is the amplitude of the constant envelope multiplexed signal $S_{RF}(t)$.

Figure 5:
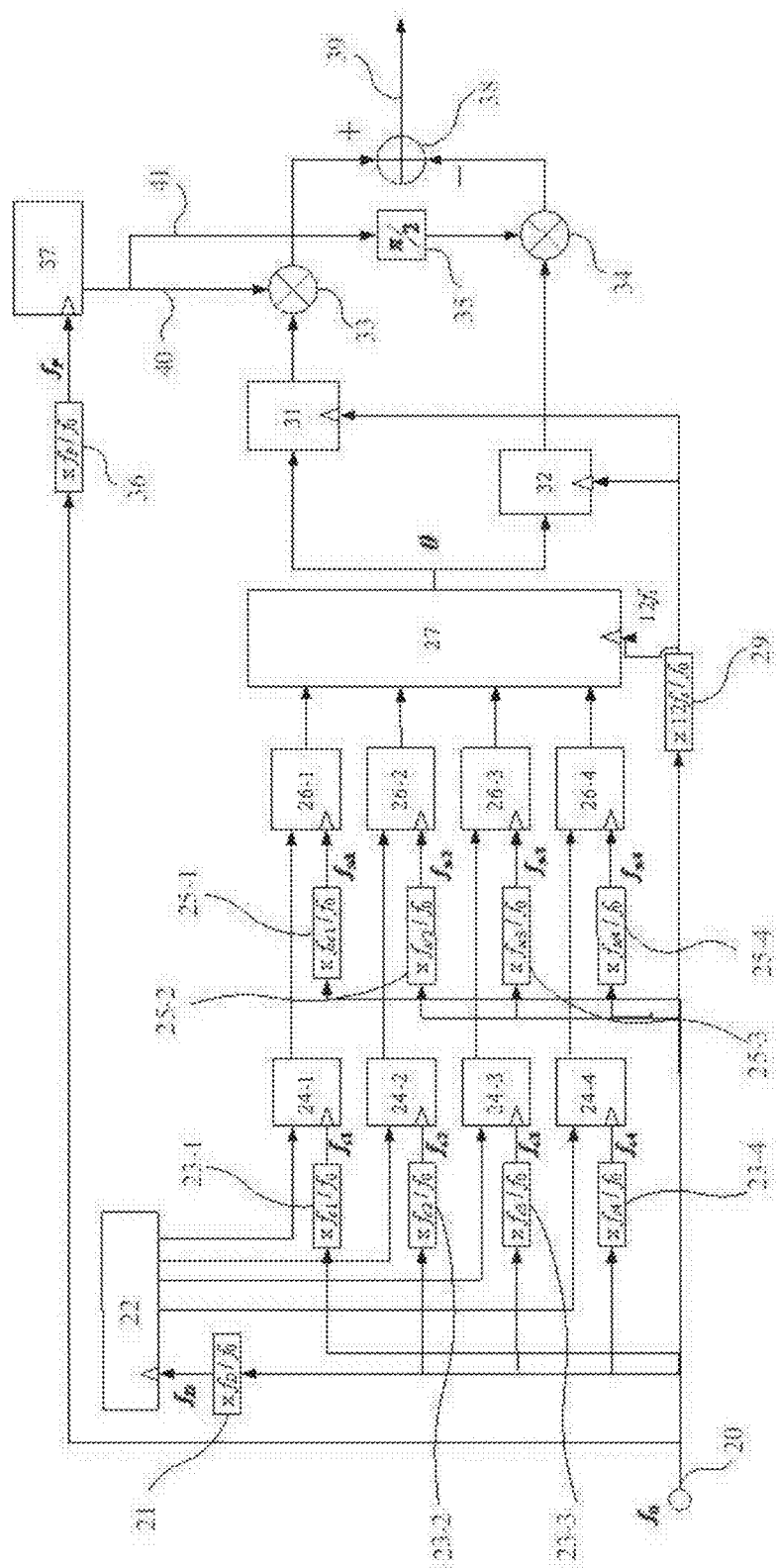
FIG. 5 illustrates an example of generating the constant envelope multiplexed signal according to an embodiment of the application.

FIG. 5 illustrates an example of generating the constant envelope multiplexed signal, according to an embodiment of the present application. The driving clock of the units is generated through the division or multiplication of the reference frequency clock $f_0$.

The reference frequency clock 20, through the frequency converter 21, is converted into a data driving clock with a frequency $f_D$, which drives the message generator 22 to generate four binary navigation messages. If a pilot channel is required in some implementations, the navigation message of the corresponding channel keeps as being 0 or 1 without changing. The reference frequency clock, through frequency converters 23-1, 23-2, 23-3 and 23-4, is converted into the driving clock with frequency of $f_{c1}$, $f_{c2}$, $f_{c3}$ and $f_{c4}$, respectively, which drives spreading modulators 24-1, 24-2, 24-3, and 24-4 to generate four binary spreading sequences, respectively, with spreading code rates of $f_{c1}$, $f_{c2}$, $f_{c3}$ and $f_{c4}$. Any of the spreading code rates is the positive integer multiple of $f_D$.

The four navigation messages generated by the message generator 22 are transmitted into the spreading modulators 24-1, 24-2, 24-3 and 24-4 respectively, to make module-2 additive combination with the spreading sequence. The results of the module 2 additive combination are sent into spreading chip waveform generators 26-1, 26-2, 26-3, 26-4 respectively. The spreading chip waveform generator is driven by subcarrier driving clocks with the frequency of $f_{sc1}$, $f_{sc2}$, $f_{sc3}$ and $f_{sc4}$, into which the clock 20 is converted through frequency converters 25-1, 25-2, 25-3 and 25-4 respectively. The spreading chip waveform generator makes BCS chip waveform assignment to the spreading sequence modulated with navigation message, and the outputs are noted as baseband signals $s_1(t)$, $s_2(t)$, $s_3(t)$, $s_4(t)$ respectively. Where $f_{sc1}=K_1 f_{c1}$, $f_{sc2}=K_2 f_{c2}$, $f_{sc3}=K_3 f_{c3}$, $f_{sc4}=K_4 f_{c4}$, and $K_1$, $K_2$, $K_3$, $K_4$ are integers greater than or equal to 1.

The clock 20, through the frequency converter 29, is converted to a driving clock with a frequency of $12f_s$, which drives an additional phase table lookup unit 27 and an I-channel trigonometric function generator 31 and a Q-channel trigonometric function generator 32.

$s_1(t)$, $s_2(t)$, $s_3(t)$, $s_4(t)$ are sent into the additional phase table lookup unit 27, which obtains the additional phase offset θ by the table looking-up, based on the value combination of $s_1(t)$, $s_2(t)$, $s_3(t)$, $s_4(t)$, corresponding to the current time slot and the modulo of the current time t and the subcarrier period $T_s=1/f_s$. The lookup table is in the form of Table 1 or Table 2. In the lookup table, P1, P2, P3, P4, P5, P6, P7, P8, P9, P10, P11, P12 are 12 different phase values, satisfying $$P_K = P_1 + \frac{k\pi}{6},$$

corresponding to the phase points in a 12-PSK constellation. $P_1$ may be set as any phase in [0,2π]. As the value of $P_1$ may be changed, the true value of the additional phases in Table 1 or Table 2 may be changed. Hence there are numerous possible values for the lookup table in the application, while the relationship among different phases in the table keeps satisfying $$P_K = P_1 + \frac{k\pi}{6},$$

and the signal generating rule with respect to the time and signal value combination also satisfies Table 1 or Table 2.

The I-channel trigonometric function generator 31 and the Q-channel trigonometric function generator 32, based on the output phase θ of the additional phase table lookup unit 27, generates the components I(t) and Q(t) in accordance with the following rules respectively, where I(t)=A cos (θ), Q(t)=A sin (θ), in which A is the amplitude with positive value and does not change over time.

The reference clock 20, through a frequency converter 36, is converted to a driving clock with a frequency of $f_p$, which drives a first carrier generator 37 to generate a carrier with the frequency of L. The carrier signal is divided into two branches. The carrier signal of a branch 40 and the output of the I-channel trigonometric function generator 31 are sent into a multiplier 33. The carrier signal of the other branch 41, after passing through π/2 phase shifting circuit 35, turns into a carrier signal with a phase orthogonal to that of the branch 40. The carrier signal of the other branch 41 and the output of the Q-channel trigonometric function generator 32 are sent into a multiplier 34. The outputs of the two multipliers are sent into an adder 38 so as to generate the constant envelope multiplexed signal 39 according to the application.

Figure 6:
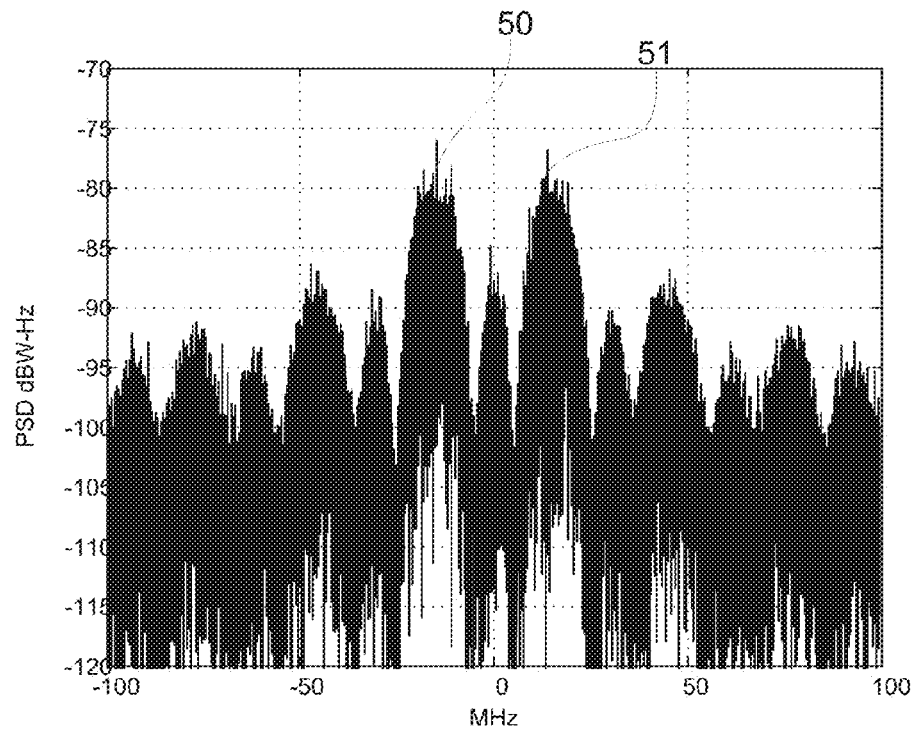
FIG. 6 illustrates a power spectral density (PSD) of the multiplexed signal according to an embodiment of the application.

FIG. 6 illustrates a power spectral density (PSD) of the multiplexed baseband signal, with rectangular pulse spreading waveform (i.e. BPSK-R modulation) adopted for each signal component, $f_{c1}=f_{c2}=f_{c3}=f_{c4}=10.23$ MHz, and $f_s=15.345$ MHz, according to an embodiment of the present application. In the PSD, the two signal components sharing the same frequency are combined together and it is difficult to distinguish the power allocation of each other. However, in the present embodiment, the upper sideband main lobe 51 with the central frequency of $f_1$ is 30.69 MHz away from the lower sideband main lobe 50 with the central frequency of $f^2$, and the bandwidth between the spectral zero-crossing points of the two lobes 50 and 51 is 20.46 MHz, corresponding to the design specifications that BPSK-R modulation with 10.23 MHz code rate is used for each signal components, and the distance between the central frequency of the two main lobes is 30.96 MHz.

As shown in the PSD, the two signal components sharing the same frequency are combined together, and it is difficult to distinguish the power allocation of each component. However, by using the receiving method 1 to receive the signal, it can be verified the combination of the four signals with the power ratio of 1:3:1:3 is achieved through the multiplexed signal.

According to the application, the four baseband spreading signals are multiplexed into a constant envelope multiplexed signal. The spreading codes of the four baseband spreading signals are of good orthogonality. In terms of the receiving and processing of the multiplexed signal, not only each signal component of the multiplexed signal independently but also the multiplexed signal as a whole can be received and processed in the receiver.

Embodiments of the present application described above are mainly involved with the transmission side, that is, with methods and devices for generating the dual-frequency constant envelope multiplexed signal with four spreading signals. In addition, embodiments of the present application also relate to signals generated through such methods and devices for generating constant envelope multiplexed signal generating as those described above.

Moreover, as can be appreciated by those skilled in the art, converse system, method, apparatus and receiver can be applied to receive and process the signals generated in the embodiments of the present application. Therefore, the embodiments of the present application also relate to systems, methods, and devices used for processing, for example, constant envelope multiplexed signals as described above.

According to an embodiment of the present application, a receiving device is provided for receiving the dual-frequency constant envelope multiplexed signal with four spreading signals generated by the aforementioned generating methods or the generating devices. In the present embodiment, the signal components modulated on the frequency $f_1$ and the frequency $f_2$ can be processed respectively.

Figure 7:
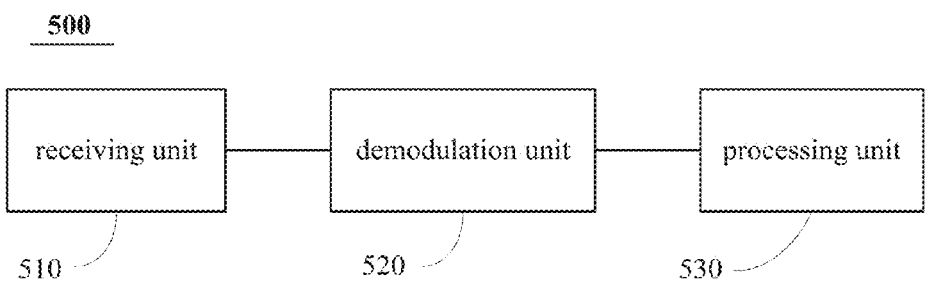
FIG. 7 illustrates a receiving device of the dual-frequency constant envelope multiplexed signal with four spreading signals according to an embodiment of the application.

In an embodiment of the present application, a receiving device is provided for the dual-frequency constant envelope multiplexed signal with four spreading signals. As shown in the FIG. 7, a signal receiving device 500 includes a receiving unit 510, a demodulation unit 520, and a processing unit 530.

The receiving unit 510 is configured to receive the constant envelope multiplexed signal. The demodulation unit 520 is configured to demodulate a signal component modulated on the frequency $f_1$ of the received constant envelope multiplexed signal, and to demodulate a signal component modulated on the frequency $f_2$ of the received constant envelope multiplexed signal. The processing unit 530 is configured to obtain the baseband spreading signals $S_1$ and $S_2$ according to the demodulated signal component which is modulated on the frequency $f_1$, and to obtain the baseband spreading signals $S_3$ and $S_4$ according to the demodulated signal component which is modulated on the frequency $f_2$.

Figure 8:
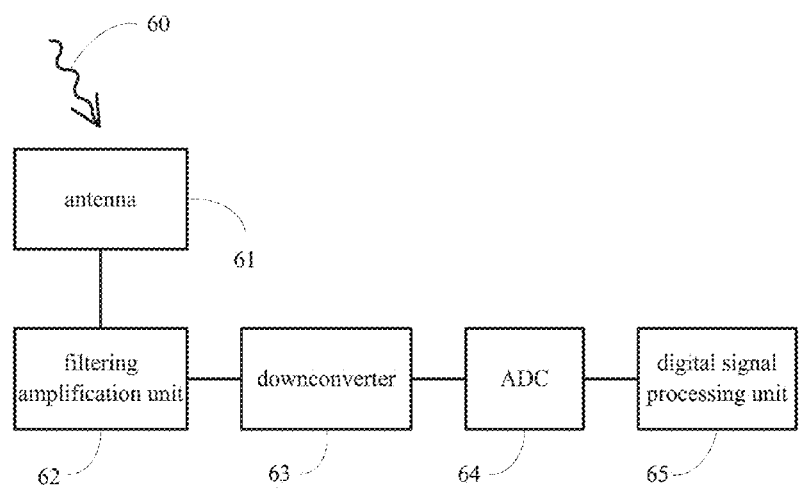
FIG. 8 illustrates a schematic diagram of the receiving device of the dual-frequency constant envelope multiplexed signal with four spreading signals according to an embodiment of the application.

FIG. 8 illustrates the schematic diagram of a particular implementation of the receiving device for the dual-frequency constant envelope multiplexed signal with four spreading signals, according to an embodiment of the present application. According to the embodiment, the receiving unit 510 may include an antenna 61; the demodulation unit 520 may include a filtering amplification unit 62, a downconverter 63, and an Analog to Digital Converter (ADC) 64; and the processing unit 530 may include a digital signal processing unit 65.

Referring to FIG. 8, when signal components are received separately, the constant envelope multiplexed signal 60 is received from antenna 61. After received by the antenna 61, the received constant envelope multiplexed signal 60 is sent into the filtering amplification unit 62, where the constant envelope multiplexed signal 60 is filtered, in order to resist the strong interference signals and out-of-band noises, and then the constant envelope multiplexed signal 60 is amplified. When processing the upper sideband signal component $s_1(t)$ or $s_2(t)$, the central frequency of the filtering unit is set near $f_1$, with bandwidth greater than or equal to the bandwidth of the signal component $s_1(t)$ or $s_2(t)$ to be received, in order to ensure that enough power of the signal component $s_1(t)$ or $s_2(t)$ passes the filtering unit; similarly, when processing the upper sideband signal component $s_3(t)$ or $s_4(t)$, the central frequency of filter is set near $f_2$, with bandwidth greater than or equal to the bandwidth of the signal component $s_3(t)$ or $s_4(t)$ to be received, in order to ensure that enough power of the signal component $s_3(t)$ or $s_4(t)$ passes the filtering unit.

The filtered and amplified signal from the filtering amplification unit 62 is sent into the downconverter 63, in order to translate the carrier frequency of the signal component to a corresponding Intermediate Frequency (IF); then the signal is sent into the ADC 64 for the sampling and quantization of the signal, and a digital IF signal is obtained.

The digital IF signal from the ADC 64 is sent into the digital signal processing unit 65. This unit can be implemented by FPGA, ASIC, universal computing unit or the combination of the aforementioned devices, so as to achieve the corresponding acquisition, tracking, demodulation to the baseband signal component to be processed.

Moreover, according to an embodiment of the present application, a receiving method is provided for receiving the dual-frequency constant envelope multiplexed signal with four spreading signals generated by the aforementioned constant envelope multiplexed signal generating method or generating device. The signal receiving method comprises: receiving the constant envelope multiplexed signal; demodulating the signal component modulated on the frequency $f_1$ of the received constant envelope multiplexed signal, and demodulating the signal component modulated on the frequency $f_2$; obtaining the baseband spreading signal $S_1$ and $S_2$ based on the demodulated signal component which is modulated on the frequency $f_1$, and obtaining the baseband spreading signal $S_3$ and $S_4$ based on the demodulated signal component which is modulated on the frequency $f_2$.

According to an embodiment of the present application, a receiving device is provided for receiving the dual-frequency constant envelope multiplexed signal with four spreading signals generated by the aforementioned constant envelope multiplexed signal generating method or generating device. In this embodiment, the received constant envelope multiplexed signal with a central frequency of $(f_1+f_2)/2$ can be processed as a whole.

Figure 9:
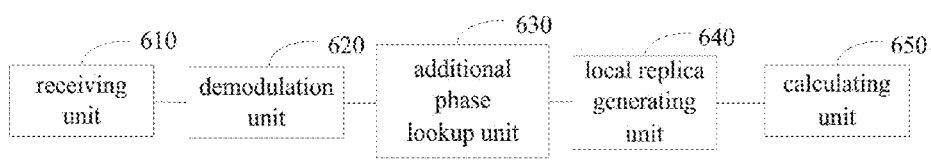
FIG. 9 illustrates a receiving device of the dual-frequency constant envelope multiplexed signal with four spreading signals, according to another embodiment of the application.

FIG. 9 illustrates a receiving device for the dual-frequency constant envelope multiplexed signal with four spreading signals, according to another embodiment of the present application. As shown in the FIG. 9, the receiving device comprises a receiving unit 610, a demodulation unit 620, an additional phase looking up unit 630, a local replica generating unit 640 and a calculating unit 650.

The receiving unit 610 is configured to receive the constant envelope multiplexed signal. The demodulation unit 620 is configured to demodulate the received constant envelope multiplexed signal with a central frequency of $f_p=(f_1+f_2)/2$ so as to obtain the demodulated baseband signal. The additional phase looking up unit 630 is configured to obtain an additional phase $\theta$ corresponding to each state among states of value combination of the four baseband spreading signals $s_1(t)$, $s_2(t)$, $s_3(t)$, $s_4(t)$ based on the additional phase lookup table. The local replica generating unit 640 is configured to generate a local replica $\tilde{I}_i(t)$ of an in-phase baseband signal and a local replica $\tilde{Q}_i(t)$ of a quadrature-phase baseband signal corresponding to each state based on the obtained additional phase $\theta$. The calculating unit 650 is configured to calculate a correlation between the generated $\tilde{I}_i(t)$ and $\tilde{Q}_i(t)$ corresponding to each state with the demodulated baseband signal, so as to determine the baseband spreading signals $s_1(t)$, $s_2(t)$, $s_3(t)$, $s_4(t)$ of the demodulated baseband signal.

As can be understood, since the value of the baseband signal is +/−1, the combination of four baseband signal values $[S_1, S_2, S_3, S_4]$ may have up to 16 combination states. The calculating unit 650 may, corresponding to each of the 16 combination states, calculate a correlation between the in-phase baseband component local replica and the quadrature-phase baseband component local replica with the in-phase baseband component and the quadrature-phase baseband component obtained from the demodulation unit 640, so as to determine values of the received first baseband signal $S_1$, the second baseband signal $S_2$, the third baseband signal $S_3$, and the forth baseband signal $S_4$. Besides, the acquisition and tracking of the constant envelope multiplexed signal can be achieved.

Referring to FIG. 9 again, a particular implementation of the receiving device for the dual-frequency constant envelope multiplexed signal with four spreading signals is illustrated, according to another embodiment of the present application. When the multiplexed signal is received and processed as a whole, the constant envelope multiplexed signal is received by the receiving unit 610 of the receiver. The received constant envelope multiplexed signal from the antenna of the receiving unit 610 is sent into the filtering amplification unit of the receiving unit 610, for filtering the constant envelope multiplexed signal to resist the strong interference signals and out-of-band noises, and for amplifying the constant envelope multiplexed signal. The central frequency of filtering unit is set near $(f_1+f_2)/2$ with a bandwidth greater than or equal to $2f_s$, to ensure that enough power of the whole multiplexed signal passes the filtering unit. If the filtering unit can designed appropriately, it is suggested to ensure that the first main lobe power of every signal component passes the filtering unit.

The filtered and amplified signal from the filtering amplification unit of the receiving unit 610 is sent into the downconverter of the demodulation 620, to convert the carrier frequency of the signal component to an Intermediate Frequency (IF); then the signal is sent into the ADC of the demodulation unit 620 for the sampling and quantization of the signal, to obtain a digital IF signal.

The digital IF signal from the ADC of the demodulation unit 620 is sent into the digital signal processing unit of the demodulation unit 620. This unit can be implemented by FPGA, ASIC, universal computing unit or the combination of the aforementioned devices. The digital IF signal is multiplied by the in-phase carrier and quadrature-phase carrier generated by the receiver, in order to remove the IF and Doppler of the digital signal, so as to obtain the receiver in-phase baseband signal SI(t) and the receiver quadrature-phase baseband signal SQ(t).

The digital signal processing unit of the demodulation unit 620 is configured to generate spreading sequences of four signals with spreading chip waveform assignment. According to all the possible value combinations of the binary baseband local signal replica of the four signals, the in-phase baseband waveform local replica $\tilde{I}_i(t)$ and the quadrature-phase baseband waveform local replica $\tilde{Q}_i(t)$ are generated by the digital signal processing unit of the demodulation unit 620 corresponding to each combination, at each epoch. The total number of value combinations is noted as g. It can be calculated that if N signals relate to data channels, there is $g=2^N$. For a specific instance among the g value combinations of $S_i=\{\tilde{s}_1, \tilde{s}_2, \tilde{s}_3, \tilde{s}_4\}$, the generating rule of $\tilde{I}_i(t)$ and $\tilde{Q}_i(t)$ is same as the transmitter. The phase additional phase looking up unit 630 obtains the additional phase $\theta_i$, corresponding to the current time by searching the phase lookup table.

The local replica generating unit 640 generates the in-phase baseband signal local replica $\tilde{I}_i(t)$ and the quadrature-phase baseband signal local replica $\tilde{Q}_i(t)$, where $\tilde{I}_i(t)=\cos(\theta_i)$ $\tilde{Q}_i(t)=\sin(\theta_i)$.

The calculating unit 650 obtains the i-th (i=1, 2, . . . , g) group of a first in-phase correlation value $corr1I_i$ and a first quadrature-phase correlation value $corr1Q_i$ by multiplying the i-th (i=1, 2, . . . , g) group of the in-phase baseband signal local replica $\tilde{I}_i(t)$ with the in-phase baseband signal SI(t) and the quadrature-phase baseband signal SQ(t) and sending the multiplying results into an integration and dumping filter for coherent integration with duration of TI, and obtains the i-th (i=1, 2, . . . , g) group of the second in-phase correlation value $corr2I_i$ and the quadrature-phase correlation value $corr2Q_i$ by multiplying each group of the quadrature-phase baseband signal local replica $\tilde{Q}_i(t)$ with the in-phase baseband signal SI(t) and the quadrature-phase baseband signal SQ(t) and sending the multiplying results into the integration and dumping filter for the coherent integration with duration of TI.

The calculating unit 650 obtains the i-th (i=1, 2, . . . , g) group of in-phase combination correlation value $I'_i$ and the quadrature-phase combination correlation value $Q'_i$ by combining the first in-phase correlation value $corr1I_i$ and the first quadrature-phase correlation value $corr1Q_i$ of the i-th group with the second in-phase correlation value corr2$I_i$ and the second quadrature-phase correlation value corr2$Q_i$ of the i-th group as:

$$\begin{cases} I'_i = \text{corr}2I_i + \text{corr}1Q_i \\ Q'_i = \text{corr}1I_i - \text{corr}2Q_i \end{cases},$$

The calculating unit 650 selects an optimal in-phase combination correlation value I' and an optimal quadrature-phase combination correlation value $Q_i'$ to be a group of in-phase combination correlation value $I_i'$ and quadrature-phase combination correlation value Q', the value $\sqrt{I_i'^2 + Q_i'^2}$ of which is the maximum among all the groups, so as to determine the baseband spreading signal $s_1(t)$, $s_2(t)$, $s_3(t)$, $s_4(t)$, and to process with I' and Q' through traditional acquisition method and tracking loop.

Embodiments of the present application may be implemented by hardware, software or the combination thereof. An aspect of the present application provides a program including executable instructions to implement the constant envelope multiplexed signal generating method, generating device, the constant envelope multiplexed signal receiving method, receiving device according to embodiments of the present application. In addition, the program can be stored in storage of any form, such as optical or magnetic readable media, chip, ROM, PROM, or any form of volatile or non-volatile memory device. According to an example of the embodiment of the present application, a machine-readable storage is provided for storing the program.

While various embodiments of the present application have been described above referring to the drawings, it should be understood that they have been presented by way of example only, and not limitation. It will be apparent to those skilled in the art that various changes in form and detail can be made therein without departing from the spirit and scope of the invention.

What is claimed is:

1. A method for generating a dual-frequency constant envelope multiplexed signal with four spreading signals, in which the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $$f_P = \frac{f_1 + f_2}{2},$$

where the signals $s_1(t)$ and $s_2(t)$ are modulated on the frequency $f_1$ with carrier phases orthogonal to each other, and the signals $s_3(t)$ and $s_4(t)$ are modulated on the frequency $f_2$ with carrier phases orthogonal to each other, $f_1 > f_2$, wherein the method further comprises:

determining a power ratio allocated to the four baseband spreading signals $s_1(t)$, $s_2(t)$, $s_3(t)$, $s_4(t)$ in the constant envelope multiplexed signal;

storing an additional phase lookup table, wherein the table includes additional phases of an in-phase baseband component I(t) and a quadrature-phase baseband component Q(t) of the constant envelope multiplexed signal, and the table is configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$;

obtaining, according to a segment of the subcarrier period of the baseband spreading signal and to a state of the value combination of the four baseband spreading signals $s_1(t)$, $s_2(t)$, $s_3(t)$ and $s_4(t)$ corresponding to the current time, an additional phase θ of a segment of the current time by looking up the additional phase lookup table;

generating an in-phase baseband component I(t) and a quadrature-phase baseband component Q(t) of the constant envelope multiplexed signal, and generating the constant envelope multiplexed signal $s_{RF}(t)$ based on the obtained additional phase θ, where $$S_{RF}(t) = I(t)\cos(2\pi f_p t) - Q(t)\sin(2\pi f_p t),$$

$$I(t) = A \cos(\theta),$$

$$Q(t) = A \sin(\theta),$$

$$f_p = \frac{f_1 + f_2}{2},$$

$$T_s = \frac{1}{f_s},$$

$$f_s = \frac{f_1 - f_2}{2},$$

where A is the amplitude of the constant envelope multiplexed signal $S_{RF}(t)$.

2. The method as claimed in claim 1, wherein the additional phase lookup table is configured by:

obtaining a preset in-phase baseband component $\hat{I}(t)$ and a preset quadrature-phase baseband component $\hat{Q}(t)$:

$$\hat{I}(t) = Z(t) \times \text{sgn}[\sin(2\pi f_s t + \varphi(t))],$$

$$\hat{Q}(t) = Z'(t) \times \text{sgn}[\sin(2\pi f_s t + \varphi'(t))],$$

wherein sgn stands for the sign function $$\text{sgn}(x) = \begin{cases} +1, & x \geq 0 \\ -1, & x < 0 \end{cases},$$

$$Z(t) = -\sqrt{\left(\sqrt{c_1}\, s_1(t) + \sqrt{c_3}\, s_3(t)\right)^2 + \left(\sqrt{c_2}\, s_2(t) - \sqrt{c_4}\, s_4(t)\right)^2},$$

$$\varphi(t) = -a\tan2\left(\sqrt{c_1}\, s_1(t) + \sqrt{c_3}\, s_3(t),\ \sqrt{c_2}\, s_2(t) - \sqrt{c_4}\, s_4(t)\right)$$

$$Z'(t) = \sqrt{\left(\sqrt{c_1}\, s_1(t) - \sqrt{c_3}\, s_3(t)\right)^2 + \left(\sqrt{c_2}\, s_2(t) + \sqrt{c_4}\, s_4(t)\right)^2},$$

$$\varphi'(t) = a\tan2\left(\sqrt{c_2}\, s_2(t) + \sqrt{c_4}\, s_4(t),\ \sqrt{c_1}\, s_1(t) - \sqrt{c_3}\, s_3(t)\right)$$

wherein $c_1$, $c_2$, $c_3$, $c_4$ are relative powers of the four baseband spreading signals $s_1(t)$, $s_2(t)$, $s_3(t)$, $s_4(t)$ respectively, and the power ratio allocated to the four baseband spreading signals $s_1(t)$, $s_2(t)$, $s_3(t)$, $s_4(t)$ is $c_1$: $c_2$: $c_3$: $c_4$, atan 2 is the four-quadrant arctangent function, $$a\tan2(y, x) = \begin{cases} \arccos\left(\frac{y}{\sqrt{x^2+y^2}}\right), & x \geq 0, \sqrt{x^2+y^2} > 0 \\ -\arccos\left(\frac{y}{\sqrt{x^2+y^2}}\right), & x < 0 \\ 0, & \sqrt{x^2+y^2} = 0 \end{cases} ;$$

and obtaining the value of the additional phase θ in the additional phase lookup table as θ=atan 2($\hat{Q}(t)$, $\hat{I}(t)$).

3. The method as claimed in claim 2, wherein the procedure of dividing a subcarrier period $T_s$ of the baseband spreading signal into multiple segments based on the determined power ratio of the four baseband spreading signals $s_1(t)$, $s_2(t)$, $s_3(t)$, $s_4(t)$ comprises:

calculating an additional phase θ=atan 2($\hat{Q}(t)$, $\hat{I}(t)$) in a subcarrier period $T_s$ of the baseband spreading signal for each state of value combination of the four baseband spreading signals $s_1(t)$, $s_2(t)$, $s_3(t)$, $s_4(t)$ based on the determined power ratio of the four baseband spreading signals $s_1(t)$, $s_2(t)$, $s_3(t)$, $s_4(t)$; and determining phase-shifting time points of the additional phase θ in the subcarrier period $T_s$ of the baseband spreading signal, and dividing the subcarrier period $T_s$ of the baseband spreading signal into multiple segments according to the phase-shifting time points.

4. The method as claimed in claim 1, wherein the power ratio of the four baseband spreading signals $s_1(t)$, $s_2(t)$, $s_3(t)$, $s_4(t)$ is 1:3:1:3, and the subcarrier period $T_s$ of the baseband spreading signal is divided into 12 segments with equal length, and the additional phase lookup table is in the form of Table 1 or Table 2:

TABLE 1

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | -1 | -1 | -1 | -1 | -1 | -1 | -1 | -1 |
| $s_2(t)$ | 1 | 1 | -1 | -1 | 1 | 1 | -1 | -1 | 1 | 1 | -1 | -1 | 1 | 1 | -1 | -1 |
| $s_3(t)$ | 1 | 1 | 1 | 1 | -1 | -1 | -1 | -1 | 1 | 1 | 1 | 1 | -1 | -1 | -1 | -1 |
| $s_4(t)$ | 1 | -1 | 1 | -1 | 1 | -1 | 1 | -1 | 1 | -1 | 1 | -1 | 1 | -1 | 1 | -1 |

| t' = t mod $T_s$ t' ∈ | | | | | | | | θ | | | | | | | | |
|---|---|---|---|---|---|---|---|---|---|---|---|---|---|---|---|---|
| [0, $T_s$/12) | P2 | P12 | P12 | P10 | P3 | P5 | P1 | P9 | P3 | P7 | P11 | P9 | P4 | P6 | P6 | P8 |
| [$T_s$/12, 2$T_s$/12) | P2 | P6 | P12 | P10 | P3 | P5 | P1 | P9 | P3 | P7 | P11 | P9 | P4 | P6 | P12 | P8 |
| [2$T_s$/12, 3$T_s$/12) | P2 | P6 | P12 | P10 | P3 | P5 | P1 | P3 | P9 | P7 | P11 | P9 | P4 | P6 | P12 | P8 |
| [3$T_s$/12, 4$T_s$/12) | P8 | P6 | P12 | P4 | P3 | P5 | P1 | P3 | P9 | P7 | P11 | P9 | P10 | P6 | P12 | P2 |
| [4$T_s$/12, 5$T_s$/12) | P8 | P6 | P12 | P4 | P9 | P5 | P1 | P3 | P9 | P7 | P11 | P3 | P10 | P6 | P12 | P2 |
| [5$T_s$/12, 6$T_s$/12) | P8 | P6 | P6 | P4 | P9 | P5 | P1 | P3 | P9 | P7 | P11 | P3 | P10 | P12 | P12 | P2 |
| [6$T_s$/12, 7$T_s$/12) | P8 | P6 | P6 | P4 | P9 | P11 | P7 | P3 | P9 | P1 | P5 | P3 | P10 | P12 | P12 | P2 |
| [7$T_s$/12, 8$T_s$/12) | P8 | P12 | P6 | P4 | P9 | P11 | P7 | P3 | P9 | P1 | P5 | P3 | P10 | P12 | P6 | P2 |
| [8$T_s$/12, 9$T_s$/12) | P8 | P12 | P6 | P4 | P9 | P11 | P7 | P9 | P3 | P1 | P5 | P3 | P10 | P6 | P6 | P2 |
| [9$T_s$/12, 10$T_s$/12) | P2 | P12 | P6 | P10 | P9 | P11 | P7 | P9 | P3 | P1 | P5 | P3 | P4 | P12 | P6 | P8 |
| [10$T_s$/12, 11$T_s$/12) | P2 | P12 | P6 | P10 | P3 | P11 | P7 | P9 | P3 | P1 | P5 | P9 | P4 | P12 | P6 | P8 |
| [11$T_s$/12, $T_s$) | P2 | P12 | P12 | P10 | P3 | P11 | P7 | P9 | P3 | P1 | P5 | P9 | P4 | P6 | P6 | P8 |

TABLE 2

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | -1 | -1 | -1 | -1 | -1 | -1 | -1 | -1 |
| $s_2(t)$ | 1 | 1 | -1 | -1 | 1 | 1 | -1 | -1 | 1 | 1 | -1 | -1 | 1 | 1 | -1 | -1 |
| $s_3(t)$ | 1 | 1 | 1 | 1 | -1 | -1 | -1 | -1 | 1 | 1 | 1 | 1 | -1 | -1 | -1 | -1 |
| $s_4(t)$ | 1 | -1 | 1 | -1 | 1 | -1 | 1 | -1 | 1 | -1 | 1 | -1 | 1 | -1 | 1 | -1 |

| t' = t mod $T_s$ t' | | | | | | | | θ | | | | | | | | |
|---|---|---|---|---|---|---|---|---|---|---|---|---|---|---|---|---|
| [0, $T_s$/12) | P1 | P12 | P12 | P11 | P3 | P4 | P2 | P9 | P3 | P8 | P10 | P9 | P5 | P6 | P6 | P7 |
| [$T_s$/12, 2$T_s$/12) | P1 | P12 | P12 | P11 | P3 | P4 | P2 | P3 | P9 | P8 | P10 | P9 | P5 | P6 | P6 | P7 |
| [2$T_s$/12, 3$T_s$/12) | P1 | P6 | P12 | P11 | P3 | P4 | P2 | P3 | P9 | P8 | P10 | P9 | P5 | P6 | P12 | P7 |
| [3$T_s$/12, 4$T_s$/12) | P7 | P6 | P12 | P5 | P3 | P4 | P2 | P3 | P9 | P8 | P10 | P9 | P11 | P6 | P12 | P1 |
| [4$T_s$/12, 5$T_s$/12) | P7 | P6 | P6 | P5 | P3 | P4 | P2 | P3 | P9 | P8 | P10 | P9 | P11 | P12 | P12 | P1 |
| [5$T_s$/12, 6$T_s$/12) | P7 | P6 | P6 | P5 | P9 | P4 | P2 | P3 | P9 | P8 | P10 | P3 | P11 | P12 | P12 | P1 |
| [6$T_s$/12, 7$T_s$/12) | P7 | P6 | P6 | P5 | P9 | P10 | P8 | P3 | P9 | P2 | P4 | P3 | P11 | P12 | P12 | P1 |
| [7$T_s$/12, 8$T_s$/12) | P7 | P6 | P6 | P5 | P9 | P10 | P8 | P9 | P3 | P2 | P4 | P3 | P11 | P12 | P12 | P1 |
| [8$T_s$/12, 9$T_s$/12) | P7 | P12 | P6 | P5 | P9 | P10 | P8 | P9 | P3 | P2 | P4 | P3 | P11 | P12 | P6 | P1 |
| [9$T_s$/12, 10$T_s$/12) | P1 | P12 | P6 | P11 | P9 | P10 | P8 | P9 | P3 | P2 | P4 | P3 | P5 | P12 | P6 | P7 |
| [10$T_s$/12, 11$T_s$/12) | P1 | P12 | P12 | P11 | P9 | P10 | P8 | P9 | P3 | P2 | P4 | P3 | P5 | P6 | P6 | P7 |
| [11$T_s$/12, $T_s$) | P1 | P12 | P12 | P11 | P3 | P10 | P8 | P9 | P3 | P2 | P4 | P9 | P5 | P6 | P6 | P7 | wherein $VS_i$, i=1, 2, 3 ..., 16 stands for 16 states of value combination of the four baseband spreading signals $s_1(t)$, $s_2(t)$, $s_3(t)$, $s_4(t)$; $P_K$, K=1,2,3 ..., 12, stands for value of the additional phase θ, where $$P_K = P_1 + \frac{k\pi}{6},$$

and $P_1$ is any phase in [0,2 π].

5. A device for generating a dual-frequency constant envelope multiplexed signal with four spreading signals, in which the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $$f_P = \frac{f_1 + f_2}{2},$$

where the signals $s_1(t)$ and $s_2$ are modulated on the frequency $f_1$ with carrier phases orthogonal to each other, the signals $s_3(t)$ and $s_4(t)$ are modulated on the frequency $f_2$ with carrier phases orthogonal to each other, $f_1>f_2$, wherein the device further comprises:

an additional phase lookup table storing unit for storing the additional phase lookup table, wherein the table includes additional phases of an in-phase baseband component I(t) and a quadrature-phase baseband component Q(t) of the constant envelope multiplexed signal, and the table is configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$;

an lookup unit for obtaining, by looking up the additional phase lookup table according to a segment of the subcarrier period of the baseband spreading signal and to a state of the value combination of the four baseband spreading signals $s_1(t)$, $s_2(t)$, $s_3(t)$, $s_4(t)$ and $s_4(t)$ corresponding to the current time, an additional phase θ of a segment of the current time;

a generating unit for generating an in-phase baseband component I(t) and a quadrature-phase baseband component Q(t) of the constant envelope multiplexed signal, and generating the constant envelope multiplexed signal $S_{RF}$ based on the obtained additional phase θ, where $S_{RF}(t)=I(t)\cos(2\pi f_p t)-Q(t)\sin(2\pi f_p t),$ $I(t)=A \cos(\theta),$ $Q(t)=A \sin(\theta),$ $$f_P = \frac{f_1 + f_2}{2},$$

$$T_s = \frac{1}{f_s},$$

$$f_s = \frac{f_1 - f_2}{2},$$

where A is the amplitude of the constant envelope multiplexed signal $S_{RF}(t)$.

6. The device as claimed in claim 5, wherein the power ratio of the four baseband spreading signals $s_1(t)$, $s_2(t)$, $s_3(t)$, $s_4(t)$ is 1:3:1:3, and the subcarrier period $T_s$ of the baseband spreading signal is divided into 12 segments with equal length, and the additional phase lookup table stored in the additional phase lookup table storing unit is in the form of Table 1 or Table 2:

TABLE 1

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | -1 | -1 | -1 | -1 | -1 | -1 | -1 | -1 |
| $s_2(t)$ | 1 | 1 | -1 | -1 | 1 | 1 | -1 | -1 | 1 | 1 | -1 | -1 | 1 | 1 | -1 | -1 |
| $s_3(t)$ | 1 | 1 | 1 | 1 | -1 | -1 | -1 | -1 | 1 | 1 | 1 | 1 | -1 | -1 | -1 | -1 |
| $s_4(t)$ | 1 | -1 | 1 | -1 | 1 | -1 | 1 | -1 | 1 | -1 | 1 | -1 | 1 | -1 | 1 | -1 |
| t' = t mod $T_s$ | | | | | | | | | | | | | | | | |
| t' ∈ | | | | | | | | θ | | | | | | | | |
| [0, $T_s$/12) | P2 | P12 | P12 | P10 | P3 | P5 | P1 | P9 | P3 | P7 | P11 | P9 | P4 | P6 | P6 | P8 |
| [$T_s$/12, 2$T_s$/12) | P2 | P6 | P12 | P10 | P3 | P5 | P1 | P9 | P3 | P7 | P11 | P9 | P4 | P6 | P12 | P8 |
| [2$T_s$/12, 3$T_s$/12) | P2 | P6 | P12 | P10 | P3 | P5 | P1 | P3 | P9 | P7 | P11 | P9 | P4 | P6 | P12 | P8 |
| [3$T_s$/12, 4$T_s$/12) | P8 | P6 | P12 | P4 | P3 | P5 | P1 | P3 | P9 | P7 | P11 | P9 | P10 | P6 | P12 | P2 |
| [4$T_s$/12, 5$T_s$/12) | P8 | P6 | P12 | P4 | P9 | P5 | P1 | P3 | P9 | P7 | P11 | P3 | P10 | P6 | P12 | P2 |
| [5$T_s$/12, 6$T_s$/12) | P8 | P6 | P6 | P4 | P9 | P5 | P1 | P3 | P9 | P7 | P11 | P3 | P10 | P12 | P12 | P2 |
| [6$T_s$/12, 7$T_s$/12) | P8 | P6 | P6 | P4 | P9 | P11 | P7 | P3 | P9 | P1 | P5 | P3 | P10 | P12 | P12 | P2 |
| [7$T_s$/12, 8$T_s$/12) | P8 | P12 | P6 | P4 | P9 | P11 | P7 | P3 | P9 | P1 | P5 | P3 | P10 | P12 | P6 | P2 |
| [8$T_s$/12, 9$T_s$/12) | P8 | P12 | P6 | P4 | P9 | P11 | P7 | P9 | P3 | P1 | P5 | P3 | P10 | P12 | P6 | P2 |
| [9$T_s$/12, 10$T_s$/12) | P2 | P12 | P6 | P10 | P9 | P11 | P7 | P9 | P3 | P1 | P5 | P3 | P4 | P12 | P6 | P8 |
| [10$T_s$/12, 11$T_s$/12) | P2 | P12 | P6 | P10 | P3 | P11 | P7 | P9 | P3 | P1 | P5 | P9 | P4 | P12 | P6 | P8 |
| [11$T_s$/12, $T_s$) | P2 | P12 | P12 | P10 | P3 | P11 | P7 | P9 | P3 | P1 | P5 | P9 | P4 | P6 | P6 | P8 |

TABLE 2

| | $VS_1$ | $VS_2$ | $VS_3$ | $VS_4$ | $VS_5$ | $VS_6$ | $VS_7$ | $VS_8$ | $VS_9$ | $VS_{10}$ | $VS_{11}$ | $VS_{12}$ | $VS_{13}$ | $VS_{14}$ | $VS_{15}$ | $VS_{16}$ |
|---|---|---|---|---|---|---|---|---|---|---|---|---|---|---|---|---|
| $s_1(t)$ | 1 | 1 | 1 | 1 | 1 | 1 | 1 | 1 | −1 | −1 | −1 | −1 | −1 | −1 | −1 | −1 |
| $s_2(t)$ | 1 | 1 | −1 | −1 | 1 | 1 | −1 | −1 | 1 | 1 | −1 | −1 | 1 | 1 | −1 | −1 |
| $s_3(t)$ | 1 | 1 | 1 | 1 | −1 | −1 | −1 | −1 | 1 | 1 | 1 | 1 | −1 | −1 | −1 | −1 |
| $s_4(t)$ | 1 | −1 | 1 | −1 | 1 | −1 | 1 | −1 | 1 | −1 | 1 | −1 | 1 | −1 | 1 | −1 |

| $t' = t \bmod T_s$ | | | | | | | | | | | | | | | | |
|---|---|---|---|---|---|---|---|---|---|---|---|---|---|---|---|---|
| $t'$ | | | | | | | | θ | | | | | | | | |
| $[0, T_s/12)$ | P1 | P12 | P12 | P11 | P3 | P4 | P2 | P9 | P3 | P8 | P10 | P9 | P5 | P6 | P6 | P7 |
| $[T_s/12, 2T_s/12)$ | P1 | P12 | P12 | P11 | P3 | P4 | P2 | P3 | P9 | P8 | P10 | P9 | P5 | P6 | P6 | P7 |
| $[2T_s/12, 3T_s/12)$ | P1 | P6 | P12 | P11 | P3 | P4 | P2 | P3 | P9 | P8 | P10 | P9 | P5 | P6 | P12 | P7 |
| $[3T_s/12, 4T_s/12)$ | P7 | P6 | P12 | P5 | P3 | P4 | P2 | P3 | P9 | P8 | P10 | P9 | P11 | P6 | P12 | P1 |
| $[4T_s/12, 5T_s/12)$ | P7 | P6 | P6 | P5 | P3 | P4 | P2 | P3 | P9 | P8 | P10 | P9 | P11 | P12 | P12 | P1 |
| $[5T_s/12, 6T_s/12)$ | P7 | P6 | P6 | P5 | P9 | P4 | P2 | P3 | P9 | P8 | P10 | P3 | P11 | P12 | P12 | P1 |
| $[6T_s/12, 7T_s/12)$ | P7 | P6 | P6 | P5 | P9 | P10 | P8 | P3 | P9 | P2 | P4 | P3 | P11 | P12 | P12 | P1 |
| $[7T_s/12, 8T_s/12)$ | P7 | P6 | P6 | P5 | P9 | P10 | P8 | P9 | P3 | P2 | P4 | P3 | P11 | P12 | P12 | P1 |
| $[8T_s/12, 9T_s/12)$ | P7 | P12 | P6 | P5 | P9 | P10 | P8 | P9 | P3 | P2 | P4 | P3 | P11 | P12 | P6 | P1 |
| $[9T_s/12, 10T_s/12)$ | P1 | P12 | P6 | P11 | P9 | P10 | P8 | P9 | P3 | P2 | P4 | P3 | P5 | P12 | P6 | P7 |
| $[10T_s/12, 11T_s/12)$ | P1 | P12 | P12 | P11 | P9 | P10 | P8 | P9 | P3 | P2 | P4 | P3 | P5 | P6 | P6 | P7 |
| $[11T_s/12, T_s)$ | P1 | P12 | P12 | P11 | P3 | P10 | P8 | P9 | P3 | P2 | P4 | P9 | P5 | P6 | P6 | P7 | wherein $VS_i$, i=1, 2, 3 . . . , 16 stands for 16 states of value combination of the four baseband spreading signals $s_1(t)$, $s_2(t)$, $s_3(t)$, $s_4(t)$; $P_K$, K=1,2,3 . . . , 12 stands for value of the additional phase θ, where $$P_K = P_1 + \frac{k\pi}{6},$$

and $P_1$ is any phase in $[0, 2\pi]$.

7. A signal receiving device to receive the constant envelope multiplexed signal as claimed in any of claims 5 through 6, which comprises:
 a receiving unit for receiving the constant envelope multiplexed signal;
 a demodulation unit for demodulating a signal component modulated on the frequency $f_1$ of the received constant envelope multiplexed signal, and for demodulating a signal component modulated on the frequency $f_2$ of the received constant envelope multiplexed signal; and
 a processing unit for obtaining baseband spreading signals $s_1(t)$ and $s_2(t)$ based on the demodulated signal component which is modulated on the frequency $f_1$, and for obtaining baseband spreading signals $s_3(t)$ and $s_4(t)$ based on the demodulated signal component which is modulated on the frequency $f_2$.

8. A signal receiving method for receiving the constant envelope multiplexed signal as claimed in any of claims 1 through 4 which comprises:
 receiving the constant envelope multiplexed signal;
 demodulating a signal component modulated on the frequency $f_1$ of the received constant envelope multiplexed signal, and for demodulating a signal component modulated on the frequency $f_2$ of the received constant envelope multiplexed signal; and
 obtaining baseband spreading signals the demodulated $s_1(t)$ and $s_2(t)$ based on the demodulated signal component which is modulated on the frequency $f_1$, and for obtaining baseband spreading signals $s_3(t)$ and $s_4(t)$ based on the demodulated signal component which is modulated on the frequency $f_2$.

9. A signal receiving device to receive the constant envelope multiplexed signal as claimed in any of claims 5 through 6, wherein the additional phase lookup table is stored in the signal receiving device and the signal receiving device comprises:

a receiving unit for receiving the constant envelope multiplexed signal;
 a demodulation unit for demodulating the received constant envelope multiplexed signal with a central frequency of $$f_p = \frac{f_1 + f_2}{2},$$

so as to obtain the demodulated baseband signal;
 an additional phase looking up unit for obtaining, based on the additional phase lookup table, an additional phase θ corresponding to each state among states of value combination of the four baseband spreading signals $s_1(t)$, $s_2(t)$, $s_3(t)$, $s_4(t)$;
 a local replica generating unit for generating, based on the obtained additional phase θ, a local replica $\tilde{I}_i(t)$ of an in-phase baseband signal and a local replica $\tilde{Q}_i(t)$ of a quadrature-phase baseband signal corresponding to each state; and
 a calculating unit for calculating a correlation between the generated $\tilde{I}_i(t)$ and $\tilde{Q}_i(t)$ corresponding to each state with the demodulated baseband signal, to determine the baseband spreading signals $s_1(t)$, $s_2(t)$, $s_3(t)$, $s_4(t)$ of the demodulated baseband signal, so as to achieve the acquisition and tracking of the constant envelope multiplexed signal.

10. A signal receiving method for receiving the constant envelope multiplexed signal as claimed in any of claims 1 through 4, wherein the signal receiving method comprises:
 storing the additional phase lookup table;
 receiving the constant envelope multiplexed signal;
 demodulating the received constant envelope multiplexed signal through a central frequency of $$f_p = \frac{f_1 + f_2}{2}$$

to obtain the demodulated baseband signal;
 obtaining, based on the additional phase lookup table, an additional phase θ corresponding to each state among states of value combination of the four baseband spreading signals $s_1(t)$, $s_2(t)$, $s_3(t)$, $s_4(t)$;

generating, based on the obtained additional phase θ, a local replica $\tilde{I}_i(t)$ of an in-phase baseband signal and a local replica $\tilde{Q}_i(t)$ of a quadrature-phase baseband signal corresponding to each state;

calculating a correlation between the generated $\tilde{I}_i(t)$ and $\tilde{Q}_i(t)$ corresponding to each state with the demodulated baseband signal, to determine the baseband spreading signals $s_1(t)$, $s_2(t)$, $s_3(t)$, $s_4(t)$ of the demodulated baseband signal, so as to achieve the acquisition and tracking of the constant envelope multiplexed signal.

11. A signal receiving device to receive the constant envelope multiplexed signal as claimed in any of claims 5 through 6, wherein the additional phase lookup table is stored in the signal receiving device and the signal receiving device comprises:

a receiving unit for receiving, filtering and amplifying the constant envelope multiplexed signal, wherein a central frequency of the filtering and amplifying is set at $$\frac{f_1 + f_2}{2};$$

a demodulation unit for converting a carrier frequency of the signal component to be processed to a corresponding intermediate frequency, converting the signal component from analog to digital by sampling and quantizing the signal, and obtaining a receiver in-phase baseband signal SI(t) and a receiver quadrature-phase baseband signal SQ(t) by multiplying the converted digital intermediate frequency signal by an in-phase carrier and a quadrature-phase carrier respectively;

an additional phase looking up unit for generating a spreading sequence of four baseband spreading signals with spreading chip waveform assignment, and generating, based on all the possible value combinations of the binary baseband local signal replica of the four baseband spreading signals, an in-phase baseband signal local replica $\tilde{I}_i(t)$ and a quadrature-phase baseband signal local replica $\tilde{Q}_i(t)$ corresponding to each combination in the additional phase looking up unit, at each epoch, wherein the number of value combinations is denoted as g, $g=2^N$, where there are N data channels, and for a special case $S_i=\{\tilde{S}_1, \tilde{S}_2, \tilde{S}_3, \tilde{S}_4\}$ among the g value combinations, the generating rule of $\tilde{I}_i(t)$ and $\tilde{Q}_i(t)$ is same as the transmitting device, and for obtaining the additional phase $\theta_i$ of the current time by looking up the additional phase lookup table;

a local replica generating unit for generating the in-phase baseband signal local replica $\tilde{I}_i(t)$ and the quadrature-phase baseband signal local replica $\tilde{Q}_i(t)$, where $\tilde{I}_i(t)=\cos(\theta_i)$ $\tilde{Q}_i(t)=\sin(\theta_i)$ a calculating unit for obtaining the i-th (i=1,2, . . . , g) group of a first in-phase correlation value $corr1I_i$, and a first quadrature-phase correlation value $corr1Q_i$ by multiplying the i-th (i=1,2, . . . , g) group of the in-phase baseband signal local replica $\tilde{I}_i(t)$ with the in-phase baseband signal SI(t) and the quadrature-phase baseband signal SQ(t) and sending the multiplying results into an integration and dumping filter for coherent integration with duration of TI, and for obtaining the i-th (i=1,2, . . . , g) group of the second in-phase correlation value $corr2I_i$ and the quadrature-phase correlation value $corr2Q_i$ by multiplying each group of the quadrature-phase baseband signal local replica $\tilde{Q}_i(t)$ with the in-phase baseband signal SI(t) and the quadrature-phase baseband signal SQ(t) and sending the multiplying results into the integration and dumping filter for the coherent integration with duration of TI;

for obtaining the i-th (i=1,2, . . . , g) group of in-phase combination correlation value $I'_i$, and the quadrature-phase combination correlation value $Q'_i$, by combining the first in-phase correlation value $corr1I_i$ and the first quadrature-phase correlation value $corr1Q_i$ of the i-th group with the second in-phase correlation value $corr2I_i$ and the second quadrature-phase correlation value $corr2Q_i$ of the i-th group as:

$$\begin{cases} I'_i = corr2I_i + corr1Q_i \\ Q'_i = corr1I_i - corr2Q_i \end{cases};$$

and for selecting an optimal in-phase combination correlation value I' and an optimal quadrature-phase combination correlation value Q' to be a group of in-phase combination correlation value $I'_i$ and quadrature-phase combination correlation value $Q'_i$, the value $\sqrt{{I'_i}^2+{Q'_i}^2}$ of which is the maximum among all the groups, so as to determine the baseband spreading signal $s_1(t)$, $s_2(t)$, $s_3(t)$, $s_4(t)$, and to process I' and Q' through traditional acquisition method and tracking loop.

12. A signal receiving method for receiving the constant envelope multiplexed signal as claimed in any of claims 1 through 4 wherein the signal receiving method comprises:

storing the mentioned additional phase lookup table;

receiving, filtering and amplifying the constant envelope multiplexed signal, wherein a central frequency of the filtering and amplifying is set at $$\frac{f_1 + f_2}{2};$$

converting a carrier frequency of the signal component to be processed to a corresponding intermediate frequency, and converting the signal component from analog to digital by sampling and quantizing the signal, and obtaining a receiver in-phase baseband signal SI(t) and a receiver quadrature-phase baseband signal SQ(t) by multiplying the converted digital intermediate frequency signal by an in-phase carrier and a quadrature-phase carrier respectively;

generating a spreading sequence of four baseband spreading signals with spreading chip waveform assignment, and generating, based on all the possible value combinations of the binary baseband local signal replica of the four baseband spreading signals, an in-phase baseband signal local replica $\tilde{I}_i(t)$ and a quadrature-phase baseband signal local replica $\tilde{Q}_i(t)$ corresponding to each combination, at each epoch, wherein the number of value combinations is denoted as g, $g=2^N$, where there are N data channels, and for a special case $S_i=\{\tilde{S}_1, \tilde{S}_2, \tilde{S}_3, \tilde{S}_4\}$ among the g value combinations, the generating rule of $\tilde{I}_i(t)$ and $\tilde{Q}_i(t)$ is same as the transmitting device, and for obtaining the additional phase $\theta_i$ of the current time by looking up the additional phase lookup table;

generating the in-phase baseband signal local replica $\tilde{I}_i(t)$ and the quadrature-phase baseband signal local replica $\tilde{Q}_i(t)$, where $$\tilde{I}_i(t)=\cos(\theta_i)$$

$$\tilde{Q}_i(t)=\sin(\theta_i); \text{ and}$$

obtaining the i-th (i=1,2, ..., g) group of a first in-phase correlation value corr1$I_i$ and a first quadrature-phase correlation value corr1$Q_i$ by multiplying the i-th (i=1, 2, ..., g) group of the in-phase baseband signal local replica $\tilde{I}_i(t)$ with the in-phase baseband signal SI(t) and the quadrature-phase baseband signal SQ(t) and sending the multiplying results into an integration and dumping filter for coherent integration with duration of TI, and for obtaining the i-th (i=1,2, ..., g) group of the second in-phase correlation value corr2$I_i$ and the quadrature-phase correlation value corr2$Q_i$ by multiplying each group of the quadrature-phase baseband signal local replica $\tilde{Q}_i(t)$ with the in-phase baseband signal SI(t) and the quadrature-phase baseband signal SQ(t) and sending the multiplying results into the integration and dumping filter for the coherent integration with duration of TI;

obtaining the i-th (i=1,2, ..., g) group of in-phase combination correlation value $I'_i$ and the quadrature-phase combination correlation value $Q'_i$ by combining the first in-phase correlation value corr1$I_i$ and the first quadrature-phase correlation value corr1$Q_i$ of the i-th group with the second in-phase correlation value corr2$I_i$ and the second quadrature-phase correlation value corr2$Q_i$ of the i-th group as:

$$\begin{cases} I'_i = \text{corr}2I_i + \text{corr}1Q_i \\ Q'_i = \text{corr}1I_i - \text{corr}2Q_i \end{cases};$$

and
selecting an optimal in-phase combination correlation value I' and an optimal quadrature-phase combination correlation value Q' to be a group of in-phase combination correlation value $I_i'$ and quadrature-phase combination correlation value $Q_i'$, the value $\sqrt{I'^2_i + Q'^2_i}$ of which is the maximum among all the groups, so as to determine the baseband spreading signal $s_1(t)$, $s_2(t)$, $s_3(t)$, $s_4(t)$, and process I' and Q' through traditional acquisition method and tracking loop.

13. A system for generating a dual-frequency constant envelope multiplexed signal with four spreading signals, in which the four baseband spreading signals $s_1(t)$, $s_2(t)$, $s_3(t)$, $s_4(t)$ are modulated to a frequency $f_1$ and a frequency $f_2$ respectively, so as to generate the constant envelope multiplexed signal on a radio carrier frequency $$f_p = \frac{f_1 + f_2}{2},$$

where the signals $s_1(t)$ and $s_2(t)$ are modulated on the frequency $f_1$ with carrier phases orthogonal to each other, and the signals $s_3(t)$ and $s_4(t)$ are modulated on the frequency $f_2$ with carrier phases orthogonal to each other, $f_1 > f_2$, the system comprising:
a processing unit including a microprocessor and a non-transitory computer readable medium, wherein the non-transitory computer readable medium includes instructions executable by the microprocessor to:
determine a power ratio allocated to the four baseband spreading signals $s_1(t)$, $s_2(t)$, $s_3(t)$, $s_4(t)$, in the constant envelope multiplexed signal;
store an additional phase lookup table, wherein the table includes additional phases of an in-phase baseband component I(t) and a quadrature-phase baseband component Q(t) of the constant envelope multiplexed signal, and the table is configured by dividing a subcarrier period $T_s$ of the baseband spreading signal into multiple segments and by determining, at each segment of the multiple segments, an additional phase θ for a state among 16 states of value combination of the four baseband spreading signals $s_1(t)$, $s_2(t)$, $s_3(t)$, $s_4(t)$ in the constant envelope multiplexed signal, based on the determined power ratio of the four baseband spreading signals $s_1(t)$, $s_2(t)$, $s_3(t)$, $s_4(t)$;
obtain, according to a segment of the subcarrier period of the baseband spreading signal and to a state of the value combination of the four baseband spreading signals $s_1(t)$, $s_2(t)$, $s_3(t)$ and $s_4(t)$ corresponding to the current time, an additional phase θ of a segment of the current time by looking up the additional phase lookup table; and
a signal generating circuit operable to generate an in-phase baseband component I(t) and a quadrature-phase baseband component Q(t) of the constant envelope multiplexed signal, and generating the constant envelope multiplexed signal $S_{RF}(t)$ based on the obtained additional phase θ, where $$S_{RF}(t)=I(t)\cos(2\pi f_p t)-Q(t)\sin(2\pi f_p t),$$

$$I(t)=A\cos(\theta),$$

$$Q(t)=A\sin(\theta),$$

$$f_p = \frac{f_1 + f_2}{2},$$

$$T_s = \frac{1}{f_s},$$

$$f_s = \frac{f_1 - f_2}{2},$$

where A is the amplitude of the constant envelope multiplexed signal $S_{RF}(t)$.

14. A system for receiving a constant envelope multiplexed signal generated by the method or the device for generating the dual-frequency constant envelope multiplexed signal with four spreading signals as claimed in any preceding claims, the system comprising:
a receiving unit for receiving the constant envelope multiplexed signal;
a demodulation unit for demodulating a signal component modulated on the frequency $f_1$ of the received constant envelope multiplexed signal, and for demodulating a signal component modulated on the frequency $f_2$ of the received constant envelope multiplexed signal;
a microprocessor and a non-transitory computer readable medium, wherein the non-transitory computer readable medium includes instructions executable by the microprocessor to:

obtain the baseband spreading signals $s_1(t)$ and $s_2(t)$ based on the demodulated signal component which is modulated on the frequency $f_1$, and obtain the baseband spreading signals $s_3(t)$ and $s_4(t)$ base on the demodulated signal component which is modulated on the frequency.

15. A method for receiving a constant envelope multiplexed signal generated by the method or the device for generating the dual-frequency constant envelope multiplexed signal with four spreading signals as claimed in any preceding claims, the method comprising:

providing a receiving unit for receiving a constant envelope multiplexed signal; and in a processing unit including a microprocessor and a non-transitory computer readable medium:

storing an additional phase lookup table;

receiving the constant envelope multiplexed signal;

demodulating the received constant envelope multiplexed signal through a central frequency $$f_p = \frac{f_1 + f_2}{2}$$

of to obtain the demodulated baseband signal;

obtaining, based on the additional phase lookup table, an additional phase θ corresponding to each state among states of value combination of the four baseband spreading signals $s_1(t)$, $s_2(t)$, $s_3(t)$, $s_4(t)$;

generating, based on the obtained additional phase θ, a local replica $\tilde{I}_i(t)$ of an in-phase baseband signal and a local replica $\tilde{Q}_i$ of a quadrature-phase baseband signal corresponding to each state; and calculating a correlation between the generated $\tilde{I}_i(t)$ and $\tilde{Q}_i(t)$ corresponding to each state with the demodulated baseband signal, to determine the baseband spreading signals $s_1(t)$, $s_2(t)$, $s_3(t)$, $s_4(t)$ of the demodulated baseband signal, so as to achieve the acquisition and tracking of the constant envelope multiplexed signal.

* * * * *

UNITED STATES PATENT AND TRADEMARK OFFICE
CERTIFICATE OF CORRECTION

PATENT NO.       : 9,680,594 B2
APPLICATION NO.  : 14/443413
DATED            : June 13, 2017
INVENTOR(S)      : Zheng Yao and Mingquan Lu It is certified that error appears in the above-identified patent and that said Letters Patent is hereby corrected as shown below:

(1) In Claim 5 (Column 24, Line 14), "$S_{RF}$" should be "$S_{RF}(t)$".

(2) In Claim 8 (Column 25, Line 57), the phrase "obtaining baseband spreading signals the demodulated" should be "obtaining baseband spreading signals".

(3) In Claim 11 (Column 28, Line 27), the equation "$\sqrt{I_i'^2 + Q_i'^2}$" should be "$\sqrt{I_i'^2 + Q_i'^2}$".

(4) In Claim 12 (Column 29, Line 45), the equation "$\sqrt{I_i'^2 + Q_i'^2}$" should be "$\sqrt{I_i'^2 + Q_i'^2}$".

(5) In Claim 14 (Column 31, Line 5), the phrase "base on the demodulated signal" should be "based on the demodulated signal".

(6) In Claim 15 (Column 31, Line 19), the phrase "through a central frequency" should be "through a central frequency of".

(7) In Claim 15 (Column 32, Line 5), the phrase "of to obtain the demodulated baseband signal" should be "to obtain the demodulated baseband signal".

Signed and Sealed this
Twenty-second Day of May, 2018

Andrei Iancu
*Director of the United States Patent and Trademark Office*